US008788628B1

(12) United States Patent
Taylor et al.

(10) Patent No.: US 8,788,628 B1
(45) Date of Patent: Jul. 22, 2014

(54) PRE-FETCHING DATA FOR A DISTRIBUTED FILESYSTEM

(75) Inventors: John Richard Taylor, Tiburon, CA (US); Randy Yen-pang Chou, San Jose, CA (US); Andrew P. Davis, Santa Cruz, CA (US)

(73) Assignee: Panzura, Inc., San Jose, CA (US)

( * ) Notice: Subject to any disclaimer, the term of this patent is extended or adjusted under 35 U.S.C. 154(b) by 228 days.

(21) Appl. No.: 13/295,844

(22) Filed: Nov. 14, 2011

(51) Int. Cl.
*G06F 15/16* (2006.01)
(52) U.S. Cl.
USPC .......................................................... 709/219
(58) Field of Classification Search
USPC .......................................................... 709/219
See application file for complete search history.

(56) References Cited

U.S. PATENT DOCUMENTS

| 8,296,398 B2* | 10/2012 | Lacapra et al. ............... 709/219 |
| 2007/0088702 A1* | 4/2007 | Fridella et al. .................. 707/10 |
| 2008/0162608 A1* | 7/2008 | Torii et al. ..................... 707/204 |
| 2011/0066668 A1* | 3/2011 | Guarraci ....................... 707/831 |
| 2012/0089781 A1* | 4/2012 | Ranade et al. ................ 711/118 |
| 2013/0204849 A1* | 8/2013 | Chacko ......................... 707/692 |

* cited by examiner

*Primary Examiner* — Kevin Bates
*Assistant Examiner* — Sm Rahman
(74) *Attorney, Agent, or Firm* — Park, Vaughan, Fleming & Dowler LLP; Mark D. Spiller

(57) ABSTRACT

The disclosed embodiments provide a system that facilitates pre-fetching data for a distributed filesystem. During operation, a cloud controller (e.g., a computing device that caches data from the distributed filesystem) that maintains a set of metadata for the distributed filesystem receives a request to access a data block for a file. The cloud controller traverses the metadata to identify a metadata entry that is associated with the block, and then uses this metadata entry to download a cloud file containing the data block from a cloud storage system. While performing these operations, the cloud controller additionally determines that an additional cloud file in the cloud storage system includes data that is likely to be accessed in conjunction with the data block, and proceeds to pre-fetch this additional cloud file from the cloud storage system.

20 Claims, 15 Drawing Sheets

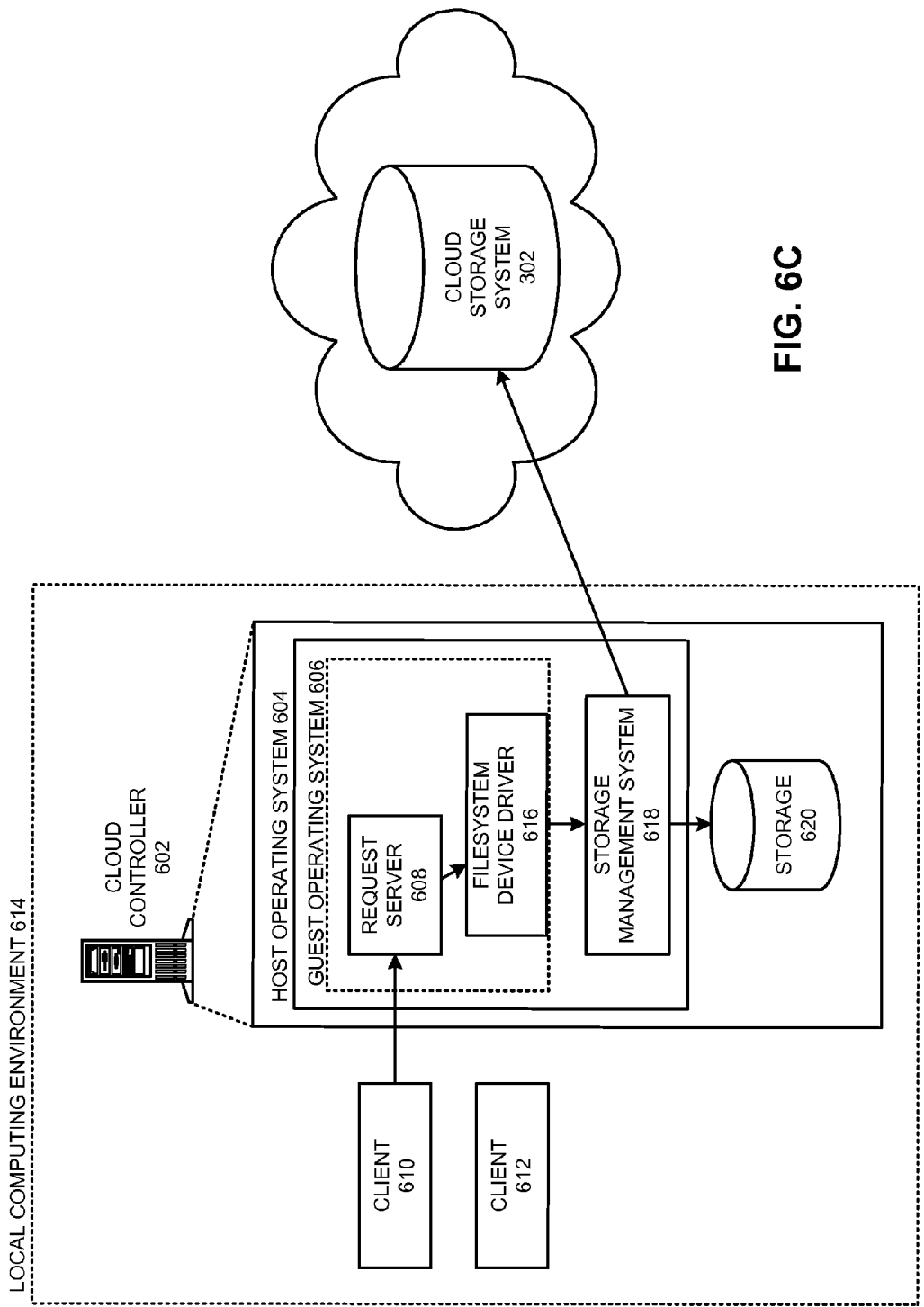

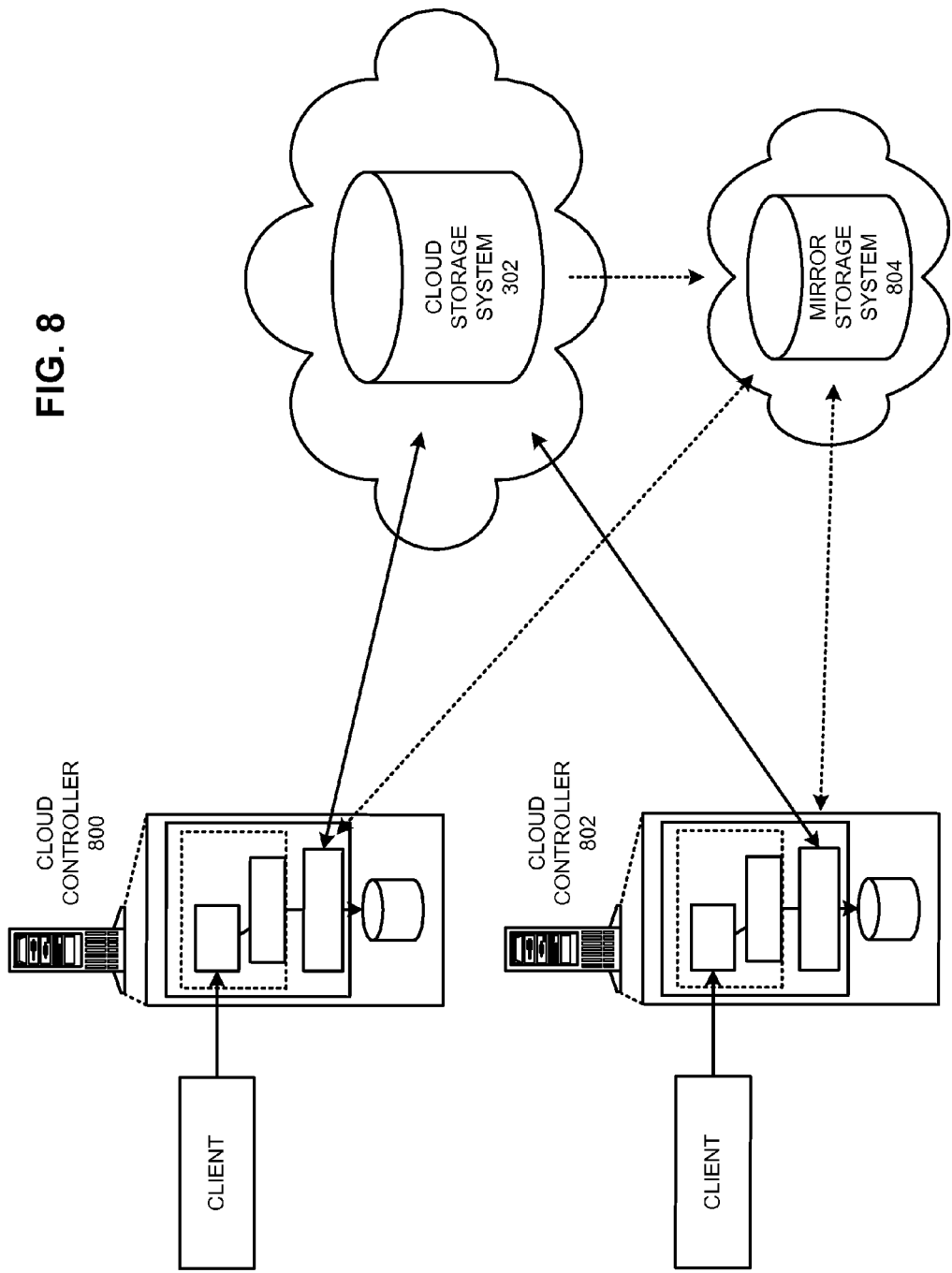

PRE-FETCHING DATA FOR A DISTRIBUTED FILESYSTEM

BACKGROUND

1. Field of the Invention

This disclosure generally relates to techniques for providing flexible and extensible network storage systems. More specifically, this disclosure relates to techniques for storing and accessing data in a distributed filesystem.

2. Related Art

Enterprise data centers typically include large numbers of storage devices that can be accessed using high-speed networks. However, the management overhead for a large number of storage devices can become substantial. For instance, maintaining data consistency, redundancy, and storage system performance in the presence of hard drive failures can involve substantial time, effort, and expertise.

A number of "cloud-based storage" vendors attempt to simplify storage management by providing large-scale remote network storage solutions. Such vendors can leverage economies of scale to provide extensive data storage capacity that can be leased and accessed by clients. Clients can leverage such storage solutions to offload storage management overhead and to quickly and easily increase their data storage capacity on an as-needed basis. However, cloud-based storage involves another set of inherent risks and overheads. For instance, storing data remotely ("in the cloud") often increases access latency, and multiple clients simultaneously accessing a shared data set in a cloud-based storage system may suffer from data consistency problems. Furthermore, network failures and/or outages in cloud-based storage systems can prevent clients from accessing their data for significant periods of time.

Hence, what is needed are techniques for providing network-based storage capabilities without the above-described problems of existing techniques.

SUMMARY

The disclosed embodiments provide a system that facilitates pre-fetching data for a distributed filesystem. During operation, a cloud controller (e.g., a computing device that manages and caches distributed filesystem data) that maintains a set of metadata for the distributed filesystem receives a request to access a data block for a file. The cloud controller traverses the metadata to identify a metadata entry that is associated with the block, and then uses this metadata entry to download a cloud file containing the data block from a cloud storage system. While performing these operations, the cloud controller additionally determines that an additional cloud file in the cloud storage system includes data that is likely to be accessed in conjunction with the data block, and proceeds to pre-fetch this additional cloud file from the cloud storage system.

In some embodiments, the cloud files stored in the cloud storage system are all fixed-size (e.g., 32 MB) and are encrypted by an uploading cloud controller prior to being written to the cloud storage system. Because of this encryption, the cloud storage system is unaware of the organization and structure of the distributed filesystem, and is unable to centrally manage the data for the distributed filesystem; instead, one or more cloud controllers collectively manage the data in the distributed filesystem.

In some embodiments, data in the distributed filesystem is indexed using a global address space, and each cloud file is uniquely indexed in this global address space. In this context, a cloud controller downloading a cloud file: (1) uses the metadata entry to determine that the desired data block is not presently cached locally; (2) uses a global address stored in the metadata entry to identify the cloud file that includes the desired data block; and (3) uses an offset stored in the metadata entry to determine the location of the data block in the cloud file.

In some embodiments, the cloud controller identifies additional data blocks and files that are likely to be referenced in close temporal proximity to the requested data block. The cloud controller can pre-fetch additional cloud files containing such temporally proximate data to reduce the download latency associated with subsequently downloading such cloud files from the cloud storage system on an on-demand basis.

In some embodiments, the cloud controller receives user feedback that indicates expected file characteristics and access patterns. The cloud controller can use this information to identify additional data blocks and files that are likely to be referenced in close temporal proximity.

In some embodiments, writes in a local transactional filesystem result in modifications for a file being distributed across multiple cloud files. While downloading a requested data block for a file, the cloud controller also determines that one or more additional blocks for the same file are not presently cached locally. The cloud controller can determine whether these additional blocks are stored in one or more additional cloud files, and pre-fetch those additional cloud files, thereby ensuring that all of the data blocks for the file are available.

In some embodiments, the cloud controller determines that one or more additional files are likely to be accessed in conjunction with the current data block. Upon determining that these additional files are not presently cached locally, the cloud controller may pre-fetch one or more cloud files that contain data blocks for these additional files.

In some embodiments, a cloud controller creates a file and metadata for the file in its local transactional filesystem. At some subsequent point, the cloud controller uploads a cloud file containing data blocks for the file to the cloud storage system, and stops caching the file (e.g., flushes the file data, but maintains the file's metadata). At a later point, upon determining that the data is needed again, the cloud controller downloads the cloud file from the cloud storage system.

In some embodiments, the cloud controller stitches data blocks from a downloaded cloud file back into its local transactional filesystem.

BRIEF DESCRIPTION OF THE FIGURES

FIG. 6C illustrates a cloud controller in which a filesystem device driver in a guest operating system forwards requests for filesystem operations in accordance with an embodiment.

FIG. 8 illustrates a distributed system in which updates are mirrored to an additional mirror storage system in accordance with an embodiment.

DETAILED DESCRIPTION

Figure 1A:
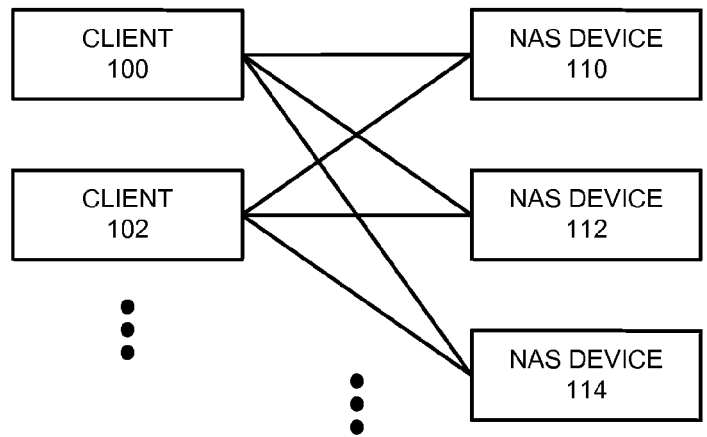
FIG. 1A illustrates a set of clients that are configured to access NAS devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Evolution of Network-Based Storage Systems

The proliferation of the Internet and large data sets have motivated a range of specialized data storage techniques. For instance, network-attached storage (NAS) devices often serve as centralized storage devices that provide large amounts of storage space for a set of heterogeneous clients in an enterprise. Such devices are typically tuned to provide a desired level of performance, redundancy (e.g., using a redundant array of independent disks (RAID)), and high availability. For example, while typical filesystems may take a substantial amount of time to recover from a crash (as the system has to process logs and/or journals to correctly rebuild modified data that was queued or in the process of being written at the time of the crash), NAS devices often incorporate transactional copy-on-write filesystems, which sacrifice some read performance in exchange for faster crash recovery. In a transactional copy-on-write filesystem, a file is not modified in place; instead, the system uses a delta encoding to append modifications ("deltas") to the previous file data. Such encodings increase the overhead associated with read operations, because the system incurs additional computation and access time to read and process deltas stored at the end of a file. However, this encoding also ensures that files are "data-consistent" (e.g., reliably incorruptible and consistent across crashes and reboots), thereby allowing NAS devices to recover quickly from failures. Such characteristics and capabilities have made NAS devices popular in enterprise environments.

Unfortunately, storage scalability can become problematic when data needs outscale the capabilities of a single NAS device; providing redundancy across multiple separate NAS devices (as illustrated in FIG. 1A) can involve substantial configuration expertise. For instance, consider the scenario of responding to a drive failure. Typically, a redundant storage system attempts to restore lost bits and re-establish redundancy as quickly as possible. However, in some scenarios, depending on the application and load, the storage system may need to place higher priority on continuing to serve client requests with a specified level of performance, and hence may need to delay restoration efforts. Storage systems typically need to be architected very carefully based on expected client needs, application needs, and load characteristics.

Figure 1B:
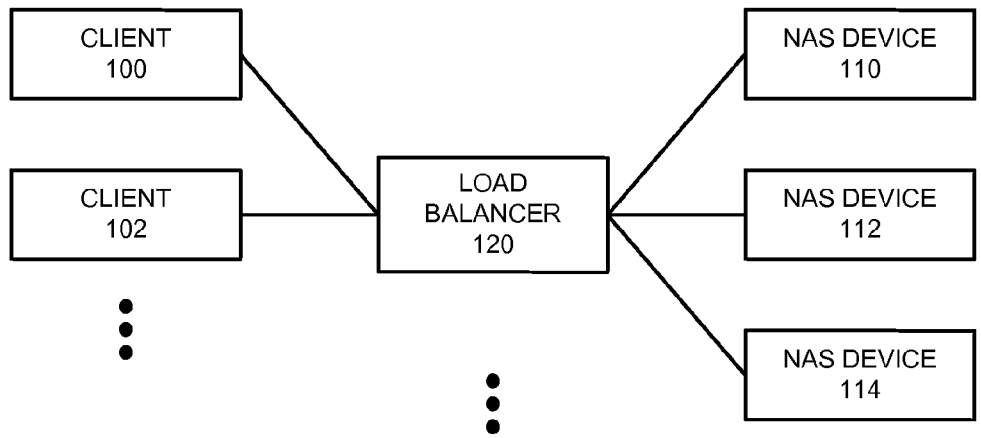
FIG. 1B illustrates a set of clients that are configured to access NAS devices via a load balancer.

FIG. 1A illustrates a set of clients (100-102) that are configured to access NAS devices (110-114). Note that management overhead typically increases in proportion with the amount of storage available. For instance, as the number of supported applications and storage space increase, a storage system may need to grow to include a load balancer 120 between the clients (100-102) and the NAS devices (110-114), as illustrated in FIG. 1B. Load balancer 120 can explicitly partition applications and clients to a given NAS device, and then route requests accordingly. While initial NAS vendors primarily focused on speed and reliability, as storage needs have continued to grow NAS vendors have also begun to compete by including sophisticated system management solutions that facilitate adapting to different storage, performance, and failure scenarios.

Figure 2:
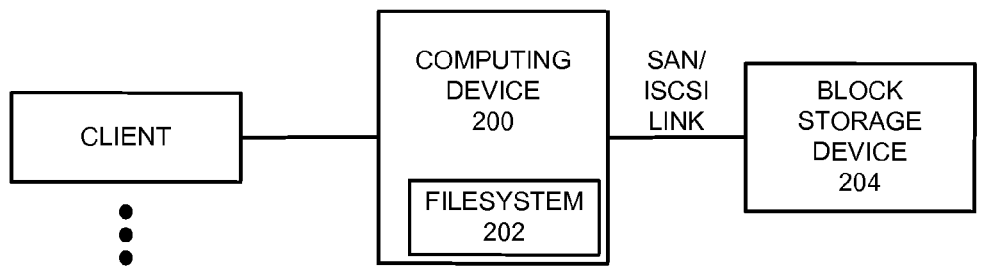
FIG. 2 illustrates a network storage system that provides remote storage with a disk-level abstraction.

FIG. 2 illustrates another network storage system that provides remote storage, but with a disk-level abstraction. In such an architecture, a computing device 200 manages metadata for a filesystem 202 locally, and then sends block-level read/write requests to a remote block storage device 204 via a storage area network (SAN) (e.g., by using the Internet Small Computer System Interface (ISCSI) or a Fibre Channel protocol). More specifically, block storage device 204 provides only a block storage interface, and is unaware of any filesystem structure associations (e.g., file names and/or structures) for the stored blocks. Such storage systems typically do not use transactional copy-on-write filesystems, and hence are not data-consistent.

Note that there is a significant distinction between filesystem-level operations and block-level (e.g., disk-level) operations. A filesystem typically serves as an intermediary between an operating system and one or more block-level devices. More specifically, a filesystem typically attempts to efficiently manage one or more block-level devices to provide more sophisticated storage services to an operating system. For instance, filesystems often manage disk blocks and metadata to provide structure (e.g., files and directories) and some notion of access rights and data consistency (e.g., via file lock operations) for an underlying block storage mechanism. Hence, filesystem-level operations provide a higher level of abstraction (e.g., a filename and an ordering associated with an underlying set of disk blocks) for the block storage mechanism.

Typically, a filesystem and an associated block storage device both operate in the context of the same computing device, and the block storage device has been specially initialized (e.g., formatted) to support the filesystem. Upon receiving a request for a filesystem operation (e.g., from an operating system and/or application), the filesystem determines and initiates a set of block-level operations needed to service the request. Hence, there is a notion of "filesystem-level information" (e.g., the level of information managed by the filesystem and received in a request for a file operation) and a separate notion of "block-level information" that is used when the filesystem operates upon the underlying block storage device. In the example of FIG. 2, the functionality of the filesystem and the underlying block storage are split across two different devices (computing device 200 and block storage device 204). As mentioned above, block storage device 204 provides only a block storage interface, and is unaware of any filesystem structure associations for the stored blocks. Block storage device 204 may store filesystem metadata on behalf of filesystem 202, but it is filesystem 202 that provides the higher level of abstraction to the operating system of computing device 200.

A number of "cloud-based storage" vendors attempt to simplify storage management by providing large-scale network storage solutions. Such vendors can leverage economies of scale to provide data centers with extensive data storage capacity that can then be rented and accessed by clients, thereby allowing clients to offload storage management overhead and easily increase their data storage on an as-needed basis. However, cloud-based storage also includes another set of inherent risks and overheads. Storing data remotely ("in the cloud") often increases access latency, and network failures and/or outages in cloud-based storage systems can prevent clients from accessing their data for substantial time intervals. Furthermore, multiple clients simultaneously accessing a shared data set in a cloud-based storage system may suffer from data consistency issues.

Consider a scenario where one remote client attempts to write a set of data to a cloud storage system, and a second remote client attempts to read the data that is being written. In some systems, a reader may not be able to see the existence of newly written file data until the entire write operation has completed (e.g., after the first remote client has closed the file). In other (non-data-consistent) arrangements, the reader may see and access the file, but because writes are stateless and potentially out-of-order (e.g., as in the Network File System (NFS) protocol), does not know which file sections have already been written, and hence may access a mix of valid data and garbage.

Embodiments of the present invention combine aspects of NAS capabilities and cloud-based storage capabilities to provide a high-capacity, high-reliability storage system that ensures that data can be accessed in a data-consistent manner.

Providing Data Consistency in a Cloud Storage System

In some embodiments, a set of caching storage devices (referred to as "cloud controllers") collectively cache, manage, and ensure data consistency for a set of data that is stored in a network storage system (e.g., a cloud-based storage system, which is also referred to as a cloud storage system). More specifically, one or more cloud controllers manage a distributed filesystem with a global address space. Each cloud controller maintains (e.g., stores and updates) metadata that describes the file and directory layout of the distributed filesystem and the location of the data blocks in the cloud storage system. Each cloud controller can also cache a subset of the data that is stored in the cloud storage system. A cloud controller that writes (or modifies) data ensures that: (1) data changes are reflected in the cloud storage system; and (2) other cloud controllers in the system are informed of file and metadata changes.

Note that while the cloud storage system stores the data for the distributed filesystem, the cloud storage capabilities may be provided by an external vendor. An enterprise storing sensitive data in the distributed filesystem may not want this vendor to be able to access such data, and hence, the cloud storage system may be configured to store the distributed filesystem's data in the form of encrypted storage volumes (referred to as "cloud files"). This configuration enhances data security, but also prevents the cloud storage system from actively assisting in ensuring data consistency and performing other operations that require knowledge of the data and data layout. More specifically, in some embodiments the cloud controllers fully manage the filesystem and manage data consistency, with the cloud storage system providing purely storage capabilities.

Figure 3:
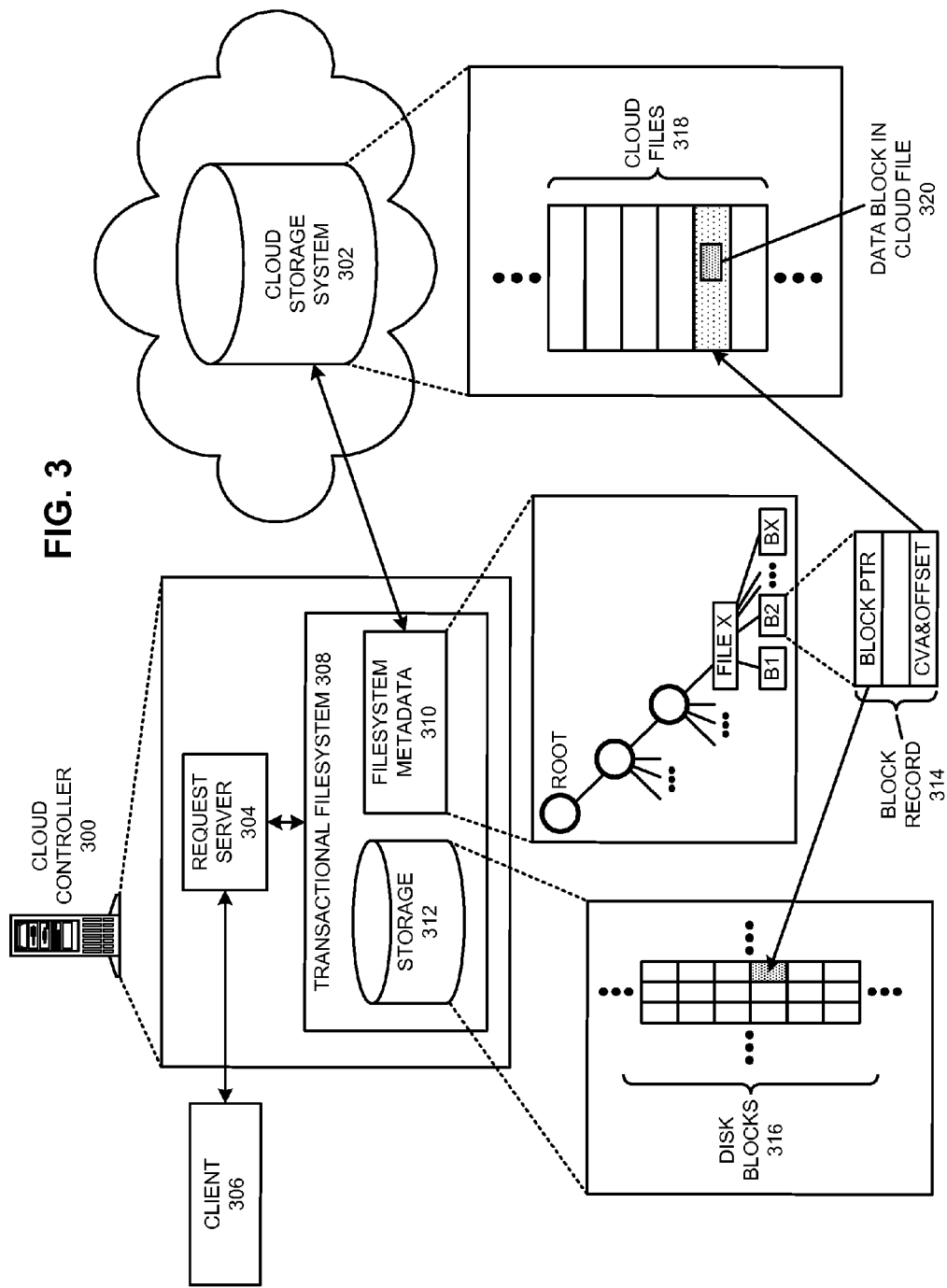
FIG. 3 illustrates an exemplary system in which a cloud controller manages and accesses data stored in a cloud storage system in accordance with an embodiment.

FIG. 3 illustrates an exemplary system in which a cloud controller 300 (e.g., a caching storage device) manages and accesses data stored in a cloud storage system 302. A request server 304 in cloud controller 300 may receive file requests from either local processes or via a network from a client 306. These requests are presented to a storage management system that includes a transactional filesystem 308 that manages a set of filesystem metadata 310 and a local storage system 312. In FIG. 3, the filesystem structure defined by metadata 310 is illustrated as a tree of pointers that define one or more levels of directories and files residing in directories. Each file is described using a set of ordered metadata structures that indicate the set of disk blocks that contain the file's data. A set of block records 314 in metadata 310 include pointer fields that indicate the location of the file data in a disk block 316 in local storage 312 (if the given block is currently being cached in the storage 312 of cloud controller 300), as well as the location of the file data in a cloud file 318. Note that disk blocks 316 and cloud files 318 may have substantially different sizes. For instance, cloud files might be much larger than disk blocks, and hence the data contained in a disk block 316 may occupy only a portion of a cloud file 320. Hence, one pointer field in block record 314 may consist of a block pointer (labeled "BLOCK PTR" in FIG. 3) that points to a specific disk block, while another field (labeled "CVA&OFFSET") may include both a pointer to a cloud file (also referred to as a "cloud virtual address," or CVA) and an offset into the cloud file.

Note that using a transactional filesystem in each cloud controller does involve some additional overhead. As described above, the transactional filesystem tracks modifications using delta encoding (instead of the more typical read/copy/modify operations used in many non-data-consistent filesystems). For instance, consider a 1 KB modification to an existing 3 KB file in a filesystem that supports 4 KB blocks. Using a traditional approach, the filesystem might read out the original 4 KB block, modify the block to reflect the updates, and then write the modified file back to the same block. In contrast, in a transactional filesystem, the original block is left unchanged, and the filesystem writes out the modifications and additional data to another empty 4 KB block. The metadata for the transactional filesystem is extended to support the notion of partial blocks and deltas (e.g., including one pointer that points to 3 KB of data in one block and another pointer that points to another block that contains 1 KB of additional data and a set of changes that should be applied to the initial 3 KB of data).

In some embodiments, using a transactional filesystem (e.g., transactional filesystem 308 in FIG. 3) in a cloud controller facilitates providing ongoing incremental snapshots of changes to a cloud storage system and other cloud controllers. More specifically, the transactional nature (e.g., the delta encoding of changes) can be extended to include a set of additional metadata structures that track recently changed data in the cloud controller. These additional metadata structures can then be used to quickly and efficiently construct compact snapshots that identify file metadata and file data that has changed due to recent write operations. Note that these snapshots do not involve copying a full set of metadata and/or every byte that was previously written for a file; instead, such snapshots compactly convey only the set of changes for the data set. Sending only a compact set of changes facilitates maintaining data consistency while minimizing the amount of data (and metadata) that needs to be transferred and processed. Sending frequent snapshots ensures that changes are quickly propagated to other cloud controllers and the cloud storage system.

In some embodiments, cloud controllers generate separate metadata snapshots and file data snapshots. Metadata is typically much smaller than file data, and is needed to access file data. Furthermore, each cloud controller is typically configured to maintain (and update) the full set of metadata, but only caches file data that is needed by local clients. Hence, uploading (or sending) a metadata snapshot separately means that the updated metadata will be more quickly available to other peer cloud controllers. Each of these peer cloud controllers can then determine (e.g., based on client data usage and needs) whether to access the related file data associated with the updated metadata. Note that a cloud controller may still upload both metadata updates and file data updates to the cloud storage system, but may split them into different sets of cloud files (or both include the metadata with the file data as well as generate another separate, duplicative update that includes only metadata) so that other cloud controllers can access the two separately. In such an organization, a cloud controller might then send a message to other cloud controllers specifying the location of the stored metadata snapshot. Alternatively, cloud controllers may also be configured to send metadata snapshots directly to a set of peer cloud controllers.

Consider an example of a cloud controller receiving a request from a client to store a 10 GB file, in an environment where the network link between the cloud controller and a cloud storage system supports a transfer speed of 1 GB/minute and the cloud controller is configured to send a metadata snapshot every minute. Upon determining the scope of the file operation, the cloud controller can already allocate a set of corresponding disk blocks and cloud files, and generate a set of corresponding metadata that indicates the respective disk addresses and CVAs for the file's data blocks. The cloud controller then uploads the file data to the cloud storage system over a time interval (e.g., roughly ten minutes), and sends out metadata snapshots that indicate the existence and location of the data blocks. The cloud controller may convey a range of information about the data being uploaded to other cloud controllers depending on the level of transparency and availability desired for modified data. For instance, in some embodiments, the file remains accessible by clients via the originating cloud controller throughout the upload process. However, other cloud controllers that have received the corresponding metadata and seek to access modified data that has not yet been received by the cloud storage system may receive an indication that the data is not yet available, and that their access attempts should be re-tried at a later time (or after a specified time interval). Alternatively, in some instances, when a set of data has not yet been uploaded to the cloud storage system, a client (and/or cloud controller) that hence cannot yet access this data via the cloud storage system may be configured to gain access to the desired data by directly interacting with the cloud controller hosting the desired data. Such alternative access techniques may depend on the capabilities and topography of the network connecting the cloud controllers and cloud storage system.

In some embodiments, the originating cloud controller may propagate additional intermediate metadata that informs other cloud controllers as portions of the modified data become available in the cloud storage system. For instance, metadata snapshots may indicate files that are in the process of being uploaded, and include a field that indicates whether a given data block has been successfully stored in the cloud storage system. The cloud controller updates (and propagates) this metadata as it receives acknowledgments of receipt from the cloud storage system, thereby indicating that some of the data being uploaded is now already available in the cloud storage system. For example, immediately after first storing the 10 GB file locally, the cloud controller may have already reserved 10 GB of space in cloud files at a given set of CVA addresses (e.g., in the cloud storage system), but have not yet transferred any file data. A snapshot sent at this point includes metadata that indicates the existence of the file, but also indicates that none of the data is available in the cloud storage system yet. After one minute, the cloud controller sends out another snapshot containing metadata that reflects the set of data that has already been transferred to (and been acknowledged as received by) the cloud storage system.

In some embodiments, each cloud controller maintains a set of structures that track snapshots and changes in metadata, and updates its local metadata to reflect updates from the rest of the distributed system. For instance, a cloud controller receiving the first snapshot from the above example may note the creation of a 10 GB file (as described in the above example), but then also determine that none of the associated data blocks is available yet. After receiving and processing the second snapshot, the receiving cloud controller determines the presence and location of the first GB of stored data that is now available. At this point, the receiving cloud controller may, if desired, use the received metadata to already download and access the available file data from the cloud storage system on behalf of a client. If, however, a client requests additional parts of the file that have not yet been stored in the cloud storage system (as indicated by the metadata in the most recent snapshot), the cloud controller can signal that the desired data is not yet available, and delay the access. More of the file data becomes available over time, as indicated by the subsequent snapshots.

Note that cloud controllers can use the detailed information received in snapshots to provide a range of data access and data consistency capabilities. More specifically, each cloud controller receives ongoing updates that identify valid data, and indicate how to find and access such data. If data is written to the cloud storage system out-of-order, this is reflected in the received snapshot(s), and the cloud controller (and/or a requesting client) can use such received snapshot information to determine how to proceed.

In some embodiments, cloud controllers may use stored snapshot data to provide access to different versions of a file. For instance, in the preceding example, a cloud controller may allow a client to already access the uploaded (and acknowledged) portions of a new file before the file has been completely uploaded to the cloud storage system. Similarly, the cloud controller may allow the client to access modified file data as it becomes available in the cloud storage system. Alternatively, in other scenarios, when an existing file is being modified, a cloud controller may be configured to present a previous version of the file to clients until the complete set of data for the modified version is available in the cloud storage system. In some embodiments, cloud controllers may maintain records of past snapshots to allow file accesses to be rolled back across multiple different versions, thereby allowing clients to view historical versions of files and/or the changes made to files over time.

In general, the disclosed techniques leverage transactional filesystem techniques and snapshots to ensure that only valid data can be accessed. While these techniques involve some additional complexity, they also provide an assurance of data consistency for a distributed filesystem that leverages cloud storage. The following sections describe additional aspects of storing and accessing data in the disclosed distributed filesystem.

Generating Snapshots and Cloud Files

A number of factors affect the performance of accessing data from a cloud storage system. In a typical computer data is stored locally on a disk, and a number of hardware and operating system mechanisms attempt to minimize the latency of reads and writes. For instance, processors and operating systems strive to load frequently used data into memory and multiple levels of hardware caches, thereby reducing the latency associated with reading data from disk. Accessing data stored on a cloud storage system involves an additional set of latencies. For instance, in addition to normal disk latency, accessing a cloud storage system may involve additional latency due to network latency, network protocol handshaking, network transfer times, and delays associated with encryption or decryption. One of the challenges of a distributed filesystem is minimizing such latencies as much as possible.

One factor that can significantly affect the latency of data access in the described distributed filesystem is cloud file size. Overly small cloud files can result in higher network negotiation and transfer overhead. Conversely, overly large cloud files can result in large transfer delays; for instance, a cloud controller that needs only a small piece of data from a large cloud file that is serially encrypted may need to wait for the entire file to be downloaded and decrypted before it can access the desired data. Determining a reasonable cloud file size that maximizes throughput to and from the cloud storage system may depend on factors such as network link size and latency (e.g., transfer speeds), local filesystem block sizes (e.g., making the cloud file size a multiple of a local block size), and CVA pointer sizes or boundaries. Another trade-off involves determining whether to use fixed-sized or variable-sized cloud files. Variable-sized cloud files allow some level of customization to match network and application characteristics, but also involve additional complexity to manage the different sizes. Hence, in some embodiments the system reduces management overhead by using a single fixed cloud file size (e.g., 32 MB) throughout the cloud controllers and cloud storage system. Note, however, that the contents of each cloud file may vary based on the set of data currently being generated or modified. For instance, data blocks being stored for large files (e.g., larger than 32 MB in the case of 32 MB cloud files) may be split across two or more cloud files. Alternatively, if the current load involves storing data for multiple small files or making a large number of small file modifications, a corresponding cloud file may contain multiple user files and deltas. Note also that, in some embodiments, data and meta-data are always separated into different cloud files. In general, cloud controllers may use a range of techniques to stripe chunks of data across cloud files in an attempt to optimize subsequent accesses from such cloud files.

Figure 4A:
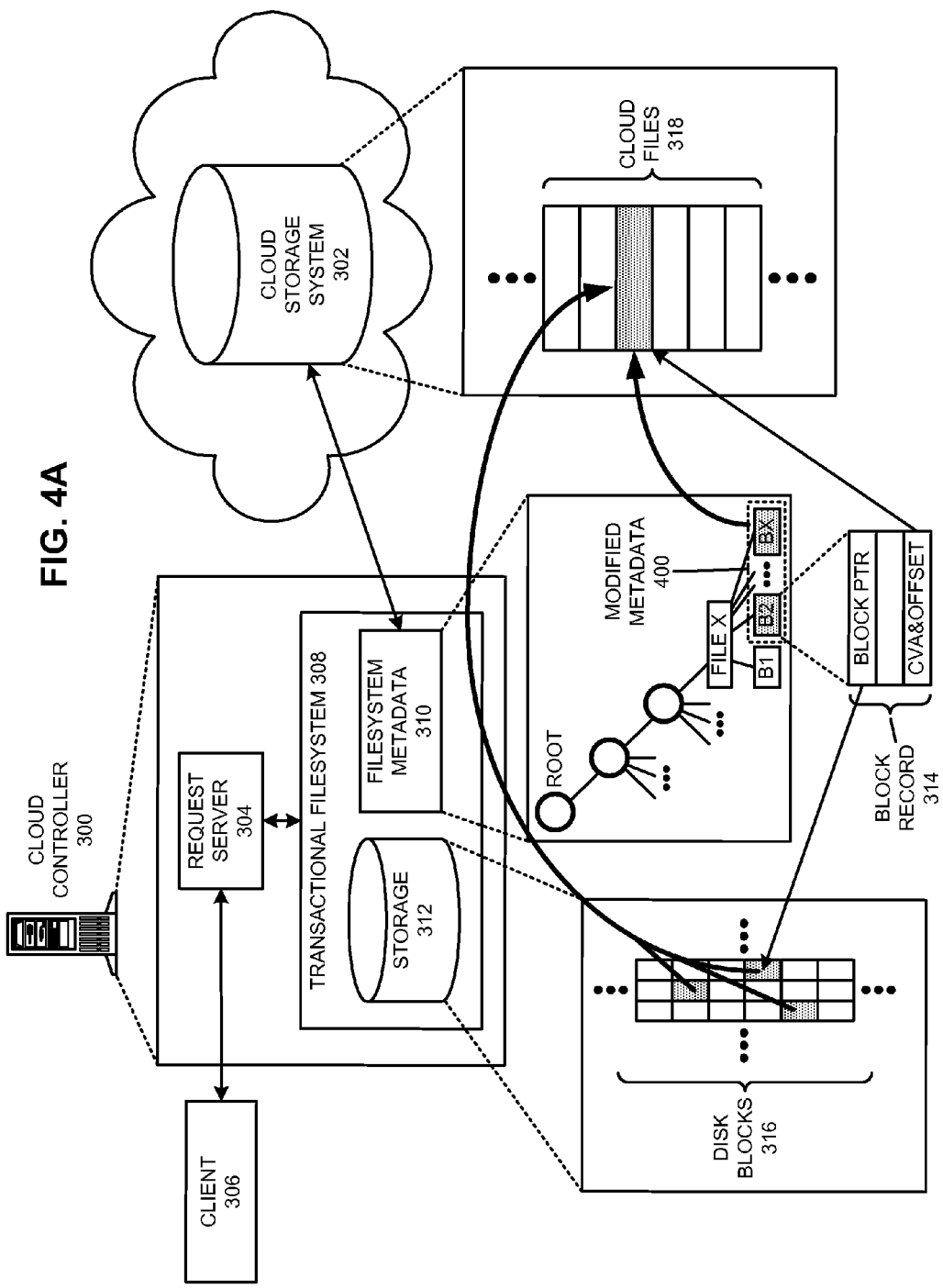
FIG. 4A illustrates the process of generating a cloud file for a snapshot in the context of the exemplary system of FIG. 3 in accordance with an embodiment.

FIG. 4A illustrates the process of generating a cloud file for a snapshot in the context of the exemplary system of FIG. 3. As indicated by filesystem metadata 310, a file ("file X") includes a set of metadata 400 and a set of disk blocks (the highlighted blocks among disk blocks 316) that have been modified since a previous snapshot. During the snapshot process, cloud controller 300 freezes the pointers in the blocks, and determines the set of metadata and data that should be written out to cloud storage system 302. The modified data is then packaged into units that match the granularity of cloud files (e.g., into 32 MB segments), optionally encrypted, and then uploaded to cloud storage system 302.

Note that cloud files are also written to in an incremental, transactional fashion, to preserve data consistency. More specifically, new and modified file data is written to a separate cloud file, as in a transactional filesystem, to ensure that the consistency of previous file versions is preserved. Thus, an initial set of data for a given file is written to one cloud file, and later additions or modifications to the file detected by a subsequent snapshot are written to a new, different cloud file.

The filesystem metadata for each disk block includes information that specifically identifies the location and enables the lookup of the disk block in a cloud file. For instance, the metadata may include one or more of the following: a CVA (cloud virtual address) that uniquely addresses the cloud file; the offset of the disk block in the cloud file; a physical and logical size for the disk block; the portions of the disk block that are valid; compression information; a checksum hash value or other checksum information; and information that indicates whether the disk block has already been successfully uploaded to the cloud storage system.

To ensure data consistency, cloud controllers need to ensure that each cloud controller assigns unique CVAs that create non-overlapping cloud files. More specifically, the cloud controllers need to collectively manage the global address space for the distributed filesystem. In some embodiments, each cloud controller is assigned a unique identifier, the collective set of cloud controllers are associated with a total amount of cloud storage space, and each cloud controller is pre-allocated a portion of the global address space. In such embodiments, a cloud controller can already allocate a cloud file in this pre-allocated address range at the time that it writes a new disk block, and store the CVA of the cloud file in the block's metadata. This organization ensures that there are no collisions in allocating cloud file addresses, and also ensures that even the first metadata snapshot for a new disk block already includes an accurate (future) location of the disk block in the cloud storage system. Note that the allocations of the global address space can be adjusted as needed over time if more data is created on a subset of the cloud controllers.

While most updates and file changes can propagate through the distributed filesystem via snapshots, some data consistency issues can arise if multiple clients accessing two different cloud controllers attempt to simultaneously write the same file. Downloading and importing snapshot data may involve some latency, and thus such conflicting operations may lead to race conditions and errors. Hence, in some embodiments, each file is associated with a cloud controller that "owns" (e.g., actively manages) the file. For instance, the cloud controller from which a file was first written may by default be registered (in the file block metadata) as the owner (e.g., the owning cloud controller) of the file. A cloud controller attempting to write a file owned by another cloud controller first contacts the owner with a request to lock the file. The owner can determine whether to grant or deny the lock request. In some embodiments, even if this request is granted, all write operations may be required to go through the cloud controller that owns the file (e.g., new data is written to the local filesystem of the owning cloud controller). Note that while every cloud controller actively manages a set of files, a given cloud controller may not need to continue to cache every disk block of files that it owns; once such blocks have been written to the cloud storage system, they may subsequently be cleared from the cloud controller to make space for other needed data. However, the metadata for all of the files in the distributed system is typically maintained in every cloud controller. In some embodiments, the system may also include mechanisms for transferring ownership of files between cloud controllers (e.g., migrating file ownership to cloud controllers that are the primary modifiers of the file to reduce network latency).

Optimizing the Creation of Cloud Files

Note that a cloud controller may use a range of techniques to generate cloud files. For instance, one such technique may involve: (1) allocating one or more cloud-file-size memory buffers; (2) copying the file and metadata for the cloud file into a memory buffer; (3) encrypting the contents of the memory buffer; and (4) uploading the encrypted contents of the memory buffer to a cloud storage system as a cloud file. Note, however, that this technique involves allocating and using additional memory buffers, and potentially performing a large number of data copy operations.

In some embodiments, a cloud controller generates an additional set of filesystem overlay metadata that allows existing file data and metadata to be virtually linked together into a cloud file view. For instance, the system can construct such overlay metadata when writing new blocks (and corresponding metadata). Alternatively, the cloud controller may instead generate such overlay metadata while traversing the filesystem to find changed data to include in the next incremental snapshot. Either way, unlike the above memory-buffer technique, this overlay metadata facilitates minimizing the use of additional resources by creating cloud files "in place" (e.g., without allocating additional memory buffers or additional copy operations); instead, a set of pointers point to the original blocks in the transactional filesystem that contain the modified data and metadata. Note that while such additional overlay metadata may involve some additional space and computational complexity, these additional needs are typically small compared to the space and copy overhead associated with other approaches.

When creating a snapshot, a cloud controller can access the overlay metadata to read, encrypt, and upload the cloud file to the cloud storage system. For instance, the overlay metadata may facilitate accessing the virtual cloud file via a special filesystem directory that presents a view of the disparate data blocks as a single, consolidated cloud file that can be read and transferred. In many scenarios the cloud controller primarily maintains overlay metadata for data that has not yet been written out to a cloud file; in some embodiments, once the data has been uploaded to the cloud storage system, the cloud controller clears the overlay metadata and begins generating new overlay metadata to track changes destined for a subsequent set of cloud files. In other embodiments, a cloud controller may maintain snapshot information and overlay cloud files locally for a longer time interval (e.g., until space constraints on the cloud controller prompt the removal of infrequently used data).

Figure 4B:
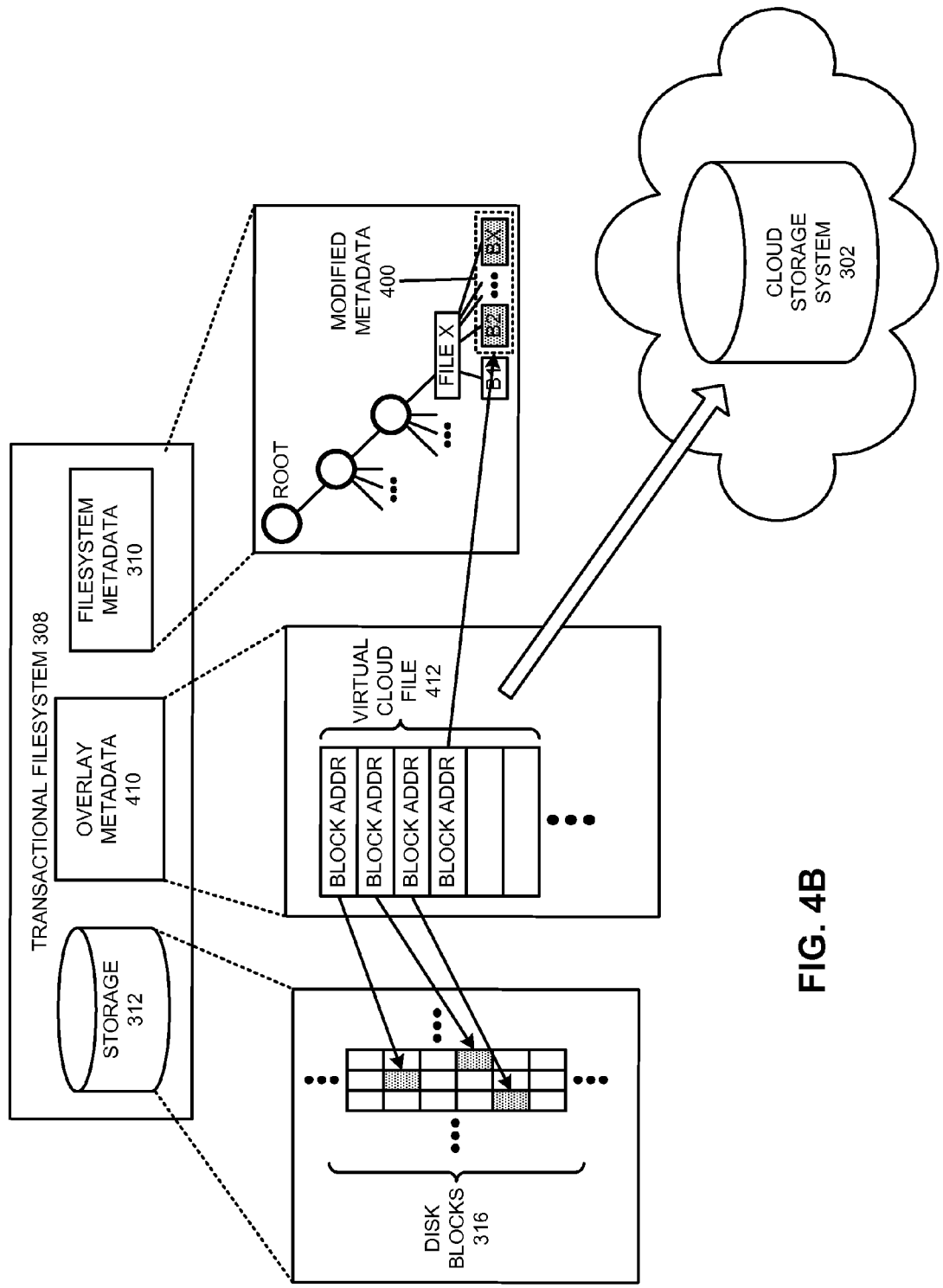
FIG. 4B illustrates a set of overlay metadata and a virtual cloud file in the exemplary system of FIG. 3 in accordance with an embodiment.

FIG. 4B illustrates a set of overlay metadata 410 and a virtual cloud file 412 in the exemplary system of FIG. 3. During operation, cloud controller 300 uses overlay metadata 410 to track the metadata 400 and data disk blocks (the highlighted blocks among disk blocks 316) that have been modified since a previous snapshot. During the snapshot process, cloud controller 300 reads and uploads the virtual cloud file 412 presented in the overlay metadata 410 into a cloud file in cloud storage system 302. Note that the transactional nature of cloud files can lead to substantial distribution of file data in a cloud storage system over time. For instance, files that are modified multiple times across multiple snapshots will be stored in different cloud files. Thus, a cloud controller that has flushed the file data (as described in more detail in the following sections) may need to download and access all of the relevant cloud files to reconstruct the file at a later time, which may involve considerable network bandwidth and time. Unfortunately, the initial cloud file for a given file is generated at the time that the first set of file data is written; at this time, little is known about the likely future access patterns for the file.

In some embodiments, a cloud controller attempts to optimize the placement of data into cloud files to reduce future access overhead. For instance, the cloud controller may strive to, when possible, store all blocks for a file in the same cloud file (e.g., assuming the size of the file and/or file modifications are smaller than the size of a cloud file). Toward this end, the cloud controller may place data into multiple cloud files in parallel, and avoid storing data for multiple files in the same cloud file unless the complete set of data for some or all of the files will fit. A cloud controller may also perform additional file grouping based on user configuration and/or automatic analysis of file access trends. For example, users may be provided with a way to configure a policy that reflects anticipated file access patterns, groupings, and/or priorities (e.g., a user policy that indicates files with a certain extension are likely to be accessed together, and thus should be grouped together).

Note that some cloud files may be partially empty. For instance, a cloud controller that is generating a snapshot based on a time interval or a cloud controller that is placing data into multiple cloud files in parallel to optimize future read operations may not have enough data to fill a complete cloud file. In such scenarios, the cloud controller may simply write out the available data, and leave the wasted space to be reclaimed using a future reclamation operation. For example, in some embodiments a cloud controller may be configured to: (1) download file data spread across two or more cloud files; (2) reassemble the desired data into a new cloud file; (3) upload the new cloud file to the cloud storage system; and (4) distribute a metadata snapshot that updates the access information for the affected files. In some scenarios, such optimizations may be performed by the cloud controller that owns the files, and involve locking the files during the cloud file defragmentation process.

Accessing Cloud Files and Managing Local Disk Layout

The previous sections disclose techniques for generating snapshots and uploading data to cloud files. Using such techniques, cloud controllers can treat the cloud storage system as an object store. Other cloud controllers receiving metadata updates can then access data from cloud files as needed. Furthermore, a cloud controller that has uploaded data can, if needed, flush data that has been uploaded from its local filesystem (e.g., "clear its cache") to make space for other data that is more likely to be needed immediately. Note, however, that a cloud controller flushing data still keeps the accompanying metadata, so that the flushed data can be found and reloaded from the cloud storage system if needed again.

Figure 4C:
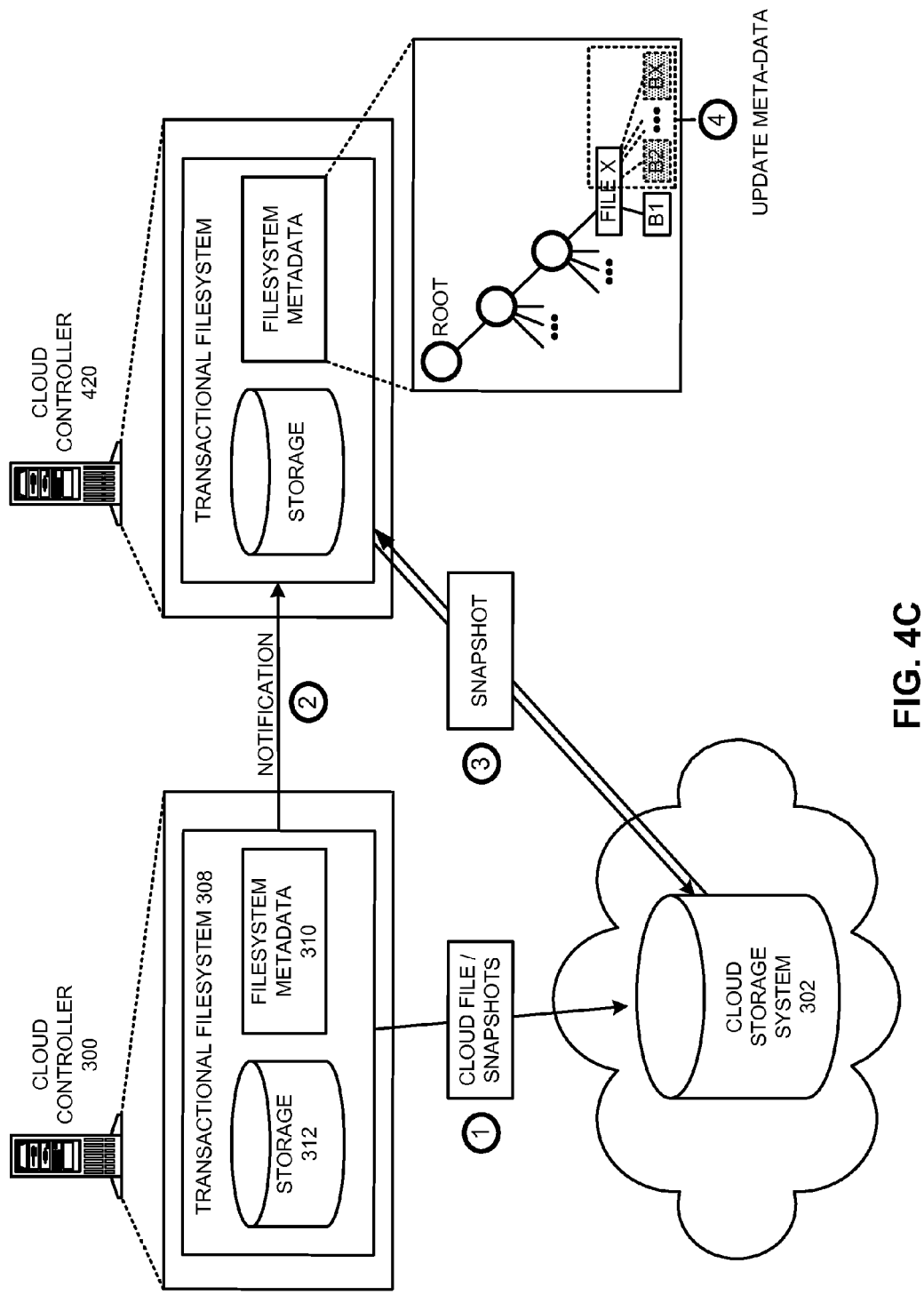
FIG. 4C illustrates a second cloud controller that responds to a snapshot sent by the first cloud controller of FIGS. 3-4B in accordance with an embodiment.

FIG. 4C illustrates a second cloud controller 420 that responds to a snapshot sent by the cloud controller 300 of FIGS. 3-4A. As described previously, cloud controller 300 generates a cloud file during a snapshot, and uploads the cloud file and the metadata snapshot to cloud storage system 302 (as indicated by (1) in FIG. 4C). Upon receiving confirmation of the successful upload, cloud controller 300 then sends a notification to other peer cloud controllers (including cloud controller 420) that informs them of the availability of the new snapshot (as indicated by (2) in FIG. 4C). Cloud controller 420 then downloads the metadata snapshot from cloud storage system 302 (as indicated by (3) in FIG. 4C), and updates its local metadata accordingly (as indicated by (4) in FIG. 4D). After updating the metadata, cloud controller 420 can proceed to download any desired data from the corresponding cloud files. Note that in some scenarios cloud controller 300 may also be configured to directly send the metadata snapshot as part of the notification (2) to cloud controller 420.

Figure 4D:
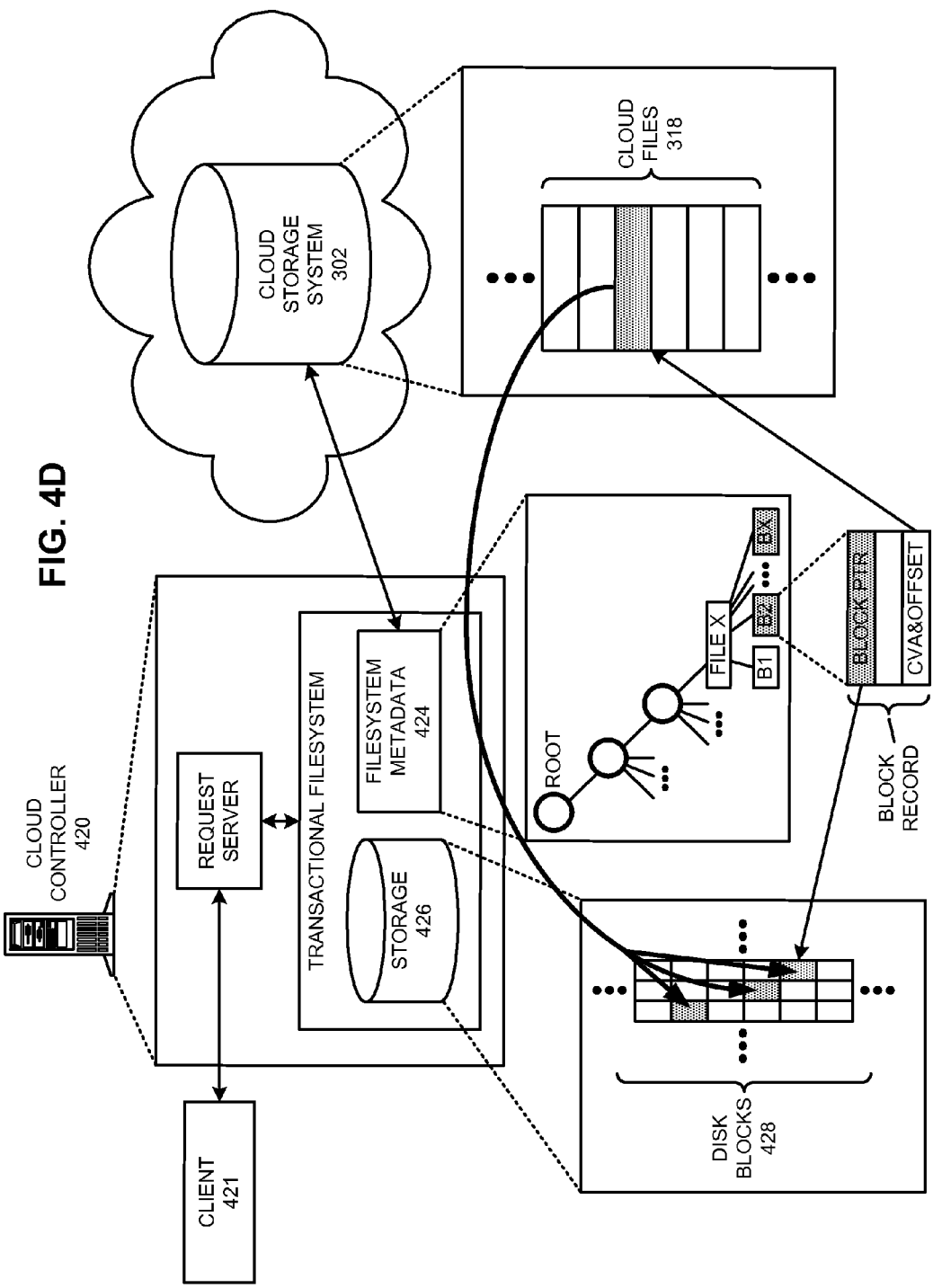
FIG. 4D illustrates the process of accessing data from a cloud file in accordance with an embodiment.

FIG. 4D illustrates the process of accessing data from a cloud file. At some point after receiving updated metadata from a snapshot (as described for FIG. 4C), cloud controller 420 receives a request from a client 421. The storage system on cloud controller 420 inspects its updated filesystem metadata 424, and determines that the request requires data that is not currently cached in local storage 426. The system then uses the lookup information in the block records of the metadata (e.g., the CVA and offset values) to determine the appropriate cloud file(s) to download. Cloud controller 420 then downloads (and decrypts, if necessary) the indicated cloud files, and uses the offset information in the metadata to unpack the desired contents of the downloaded cloud file(s).

In some embodiments, a cloud controller downloads a cloud file into a dedicated memory buffer, and operates directly upon this memory buffer to access the desired data. The cloud file format is easy to operate upon in memory, and the downloaded data can be accessed very quickly from memory. However, storing such blocks in memory also constrains memory use, and (depending on the application) client data demands may involve reloading and caching more data than can be stored in memory. Furthermore, operating upon downloaded cloud files purely in memory may require a cloud file to be re-downloaded if the cloud controller is power cycled. Hence, in alternative embodiments, the cloud file is unpacked and re-integrated into the local transactional filesystem of a downloading cloud controller (e.g., into the highlighted subset of disk blocks 428 in FIG. 4D). Integrating downloaded cloud file data into the local filesystem allows all filesystem accesses to operate in the same manner (e.g., as opposed to special memory-buffer accesses for downloaded cloud file data), and facilitates keeping the downloaded data persistent across power cycles.

Note that a cloud controller can choose the target disk blocks that will receive the downloaded data blocks; for instance, in the context of FIG. 4D, cloud controller 420 is not constrained to use the same set of disk blocks used by cloud controller 300 to store the same data. In some instances, this selection process may involve determining disk blocks containing data that has not been accessed recently (e.g., via a least-recently-used (LRU) policy), and flushing such data. Each cloud controller tracks the usage of its cached data blocks, and strives to cache data blocks that minimize that latency experienced by clients.

Some fragmentation issues can arise on cloud controllers over time, as cached data is flushed and new (and/or old) data is loaded from cloud files. Recall that cloud controllers typically maintain the full set of metadata, but flush actual data as needed. In general, as new data is created and written into files, target disk blocks are found to store the resulting data and metadata. To optimize reads and writes, a filesystem normally places metadata in close proximity to its referenced data. However, such organization can lead to fragmentation issues for a system in which data can be flushed (and reloaded), but metadata remains persistent. More specifically, if such data is stored interleaved and relatively continuously (e.g., to improve read access), the subsequent holes left by flushed data may be refilled with new metadata and data. Over time, these operations lead to substantial fragmentation, with small pieces of metadata strewn across the disk and a rarity of larger contiguous disk areas that can be used to store new file data. In some cases disk defragmentation techniques may be used to alleviate some of these issues, but defragmentation is typically both time- and disk-intensive, and client data access performance may be degraded during the defragmentation process.

In some embodiments, the block allocation policy used in a cloud controller's transactional filesystem is altered to prioritize a selected set of disk sectors toward either data or metadata. More specifically, by dynamically weighting some disk blocks toward metadata, the filesystem can create dedicated, metadata areas on the disk that are distinct from their respective data blocks, and no longer interleaved on a per-file basis. While distinct, these metadata areas can still be allocated in close-enough proximity to the data blocks that they reference that both can be read without substantially degrading performance. When data is subsequently flushed, all of the disk blocks holding data are cleared, and new data and metadata can be written into the disk region; new metadata is written into the disk blocks weighted toward metadata, while the new data blocks can be stored into the nearby (flushed) disk blocks. Because metadata is typically much smaller than the actual file data (e.g., in many scenarios metadata is on the order of 0.1% of the size of the file data that it manages), this arrangement facilitates avoiding fragmentation across a large number of write/flush cycles.

Note that the amount of metadata in a distributed filesystem may, depending on the client and application load, grow significantly over time. Hence, cloud controllers may need to periodically adjust the number and weighting of disk blocks containing metadata, so that more blocks that store metadata are allocated in proximity to a set of blocks used to store file data. Note also that in some embodiments the filesystem may attempt to optimize read accesses by trying to store (where possible) disk blocks that have been loaded from cloud files in proximity to their metadata.

Pre-fetching Cloud Files

As mentioned previously, cloud files are also written to in an incremental, transactional fashion. For instance, files that are written and/or modified across multiple snapshots may have data stored in different cloud files. Unfortunately, accessing data split across multiple cloud files can increase access latency substantially. Consider a client that sends a request to a cloud controller to access a data block in a file. The cloud controller inspects its current set of metadata, determines that the data block is not currently cached, downloads the corresponding cloud file containing the data block, and presents the data block to the client. The client may then request additional data blocks from the same file. In some scenarios, all of these blocks will have been stored in the same cloud file, and are now available in the cloud controller. If, however, some of these file blocks are in another cloud file, the client will have to endure another set of network, download, and processing latency as one or more additional cloud files are accessed. While an initial delay may be acceptable, recurring access delays may cause a noticeable delay and substantial user frustration.

In some embodiments, a cloud controller predictively pre-fetches additional cloud files in an attempt to reduce access latency. For instance, upon receiving a request to access a given data block for a file, a cloud controller may analyze the metadata for the file and then predictively pre-fetch other cloud files that contain other nearby data blocks (or even all other data blocks for the file, depending on the file size). Alternatively (and/or additionally), the cloud controller may also pre-fetch data for other associated files that are likely to be accessed in conjunction with the original file. In both situations, the cloud controller can traverse its stored set of metadata to look up the physical locations (e.g., the CVAs and offsets) for cloud files that should be pre-fetched from the cloud storage system.

Note that the amount and range of pre-fetching performed may vary based on factors such as the available network bandwidth, cloud controller load, and types of accessing clients or applications. For instance, a basic optimization may involve pre-fetching data for other files in the same directory as the current file being accessed. More sophisticated pre-fetching techniques may involve receiving application (or user) feedback that specifies file associations and/or files that are likely to be needed soon. Cloud controllers may also be configured to track access patterns over time to determine files and file sections that have temporal locality. For example, consider a large (e.g., terabyte-sized) set of seismic data that is typically accessed sequentially. Cloud controller tracking may: (1) detect the sequential nature of the data; (2) make note of this behavior in the file's metadata; and then (3) perform selective pre-fetching upon successive accesses to ensure that each subsequent cloud file is pre-fetched, thereby providing latency-free file access for a client. Note that some of these techniques may also facilitate initially grouping commonly accessed files and/or data blocks into the same cloud file so that they can be accessed more efficiently at a later time.

Figure 5:
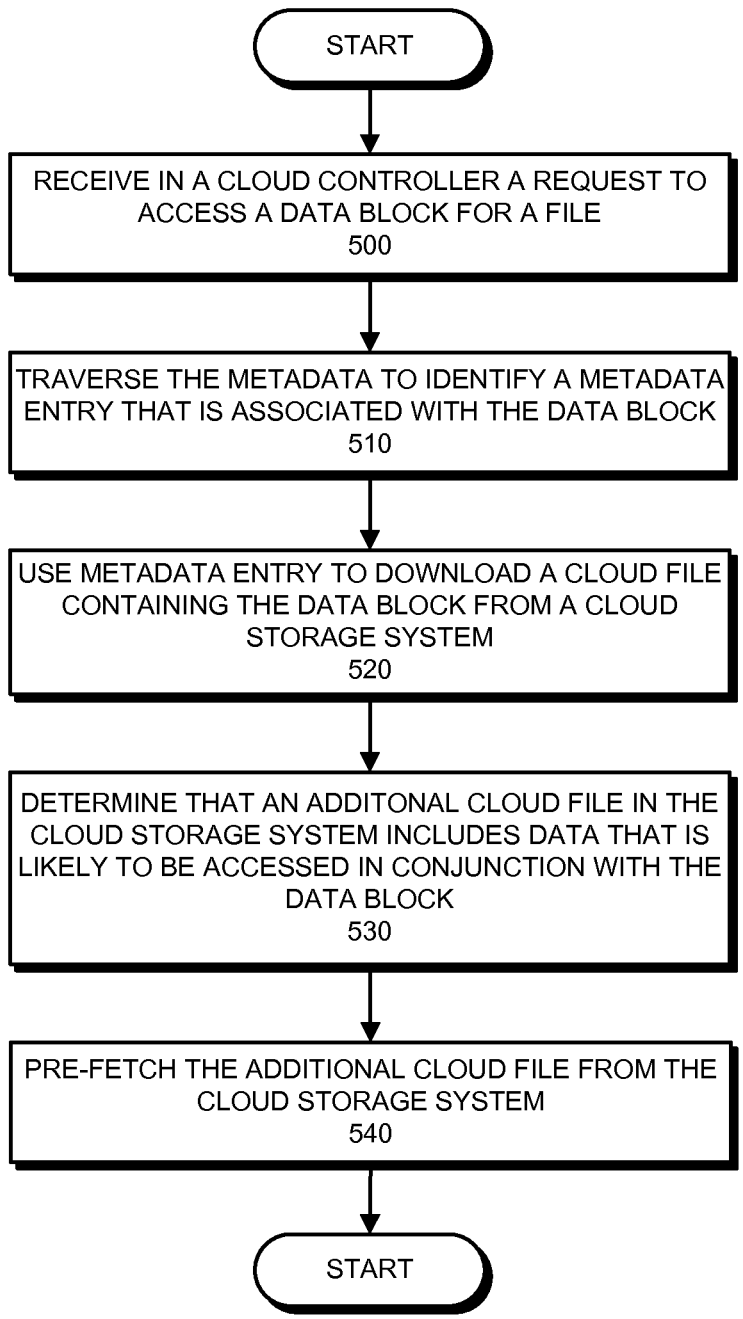
FIG. 5 presents a flow chart that illustrates the process of pre-fetching data for a distributed filesystem in accordance with an embodiment.

FIG. 5 presents a flow chart that illustrates the process of pre-fetching data for a distributed filesystem. During operation, a cloud controller that maintains a set of metadata for the distributed filesystem receives a request to access a data block for a file (operation 500). The cloud controller traverses the metadata to identify a metadata entry that is associated with the data block (operation 510), and then uses this metadata entry to download a cloud file containing the data block from a cloud storage system (operation 520). While performing these operations, the cloud controller additionally determines that an additional cloud file in the cloud storage system includes data that is likely to be accessed in conjunction with the data block (operation 530), and proceeds to pre-fetch this additional cloud file from the cloud storage system (operation 540).

Receiving and Servicing Client Requests

Client systems typically use network protocols (such as the Network File System (NFS) and the Common Internet File System (CIFS) protocols) to access network-based storage systems. CIFS (also sometimes referred to as Server Message Block (SMB)) is a complex application-layer network protocol that includes many application-specific capabilities that blur the typical separation between filesystems and applications. When a user accesses a file on a client system using software (e.g., Microsoft Office) that supports CIFS functionality, the client system may send CIFS requests to the network storage system to inform that the file has been opened and to store specific data. The CIFS server receiving the request for the file operation recognizes the file type, and can provide application-specific support. For instance, the CIFS server may maintain a network connection, and after determining that only that client is accessing the file, instruct the client to continue to cache file data indefinitely. Later, upon detecting that another client is attempting to open the file, the CIFS server can instruct the first client to flush the cached file data, and provide collaboration capabilities to both clients. Such functionality can enhance the user experience, but can complicate the interface between clients and storage systems; crafting a high-performance implementation of the CIFS protocol can involve substantial effort and expense.

In addition to complexity, CIFS also suffers from a range of other drawbacks and/or limitations. CIFS does not allow requests to be proxied; all requests need to be addressed directly to the hosting server, which locks the underlying data. CIFS is also a "chatty" protocol (e.g., CIFS generates substantial bi-directional status and update traffic). In a distributed environment, these characteristics can result in substantial load and latency issues.

Embodiments of the present invention combine cloud controllers with NAS capabilities and cloud-based storage to provide a high-capacity, high-reliability storage system that can be accessed from multiple front-ends via an application-layer network protocol (e.g., CIFS).

In some embodiments, a customized filesystem device driver in an operating system decouples filesystem functionality from an underlying block storage mechanism, thereby allowing filesystem-level information to be forwarded to another filesystem and/or data management mechanism. For instance, in some embodiments a customized filesystem device driver in an operating system may forward such filesystem-level request information to a range of network storage devices and/or distributed architectures that can provide enhanced data storage capabilities to client computing devices.

Operating systems often support several standard filesystems (e.g., the DOS filesystem, the New Technology File System (NTFS), and CDROM filesystems), but sometimes also include an open interface that facilitates accessing special devices and providing third-party interoperability (e.g., to support USB flash drives and filesystems associated with other operating systems, and to allow the development and support of future filesystems). In some embodiments, such interfaces can be used to create a filesystem device driver that emulates a local filesystem and storage device to the local operating system, but actually instead forwards filesystem-level request information to (and receives responses from) a non-block-level storage management system and/or filesystem.

In some embodiments, the disclosed forwarding techniques facilitate leveraging an existing implementation of a request server to reduce implementation overhead and complexity. For instance, as described above, implementing CIFS involves substantial effort and expense. Hence, some embodiments may provide CIFS capabilities by executing an operating system (e.g., Microsoft Windows Server 2008 Core, which includes embedded, high-performance CIFS server functionality with low memory usage) that can manage CIFS requests, but then use a customized filesystem device driver to extract and forward filesystem-level information that was received in CIFS requests. Note that this is distinct from techniques that direct file operation requests to a filesystem (such as NTFS) that then directly performs corresponding block-level operations upon a block storage device; forwarding filesystem-level information facilitates adding additional layers of capabilities and services prior to (or in place of) performing lower-level storage operations.

Figure 6A:
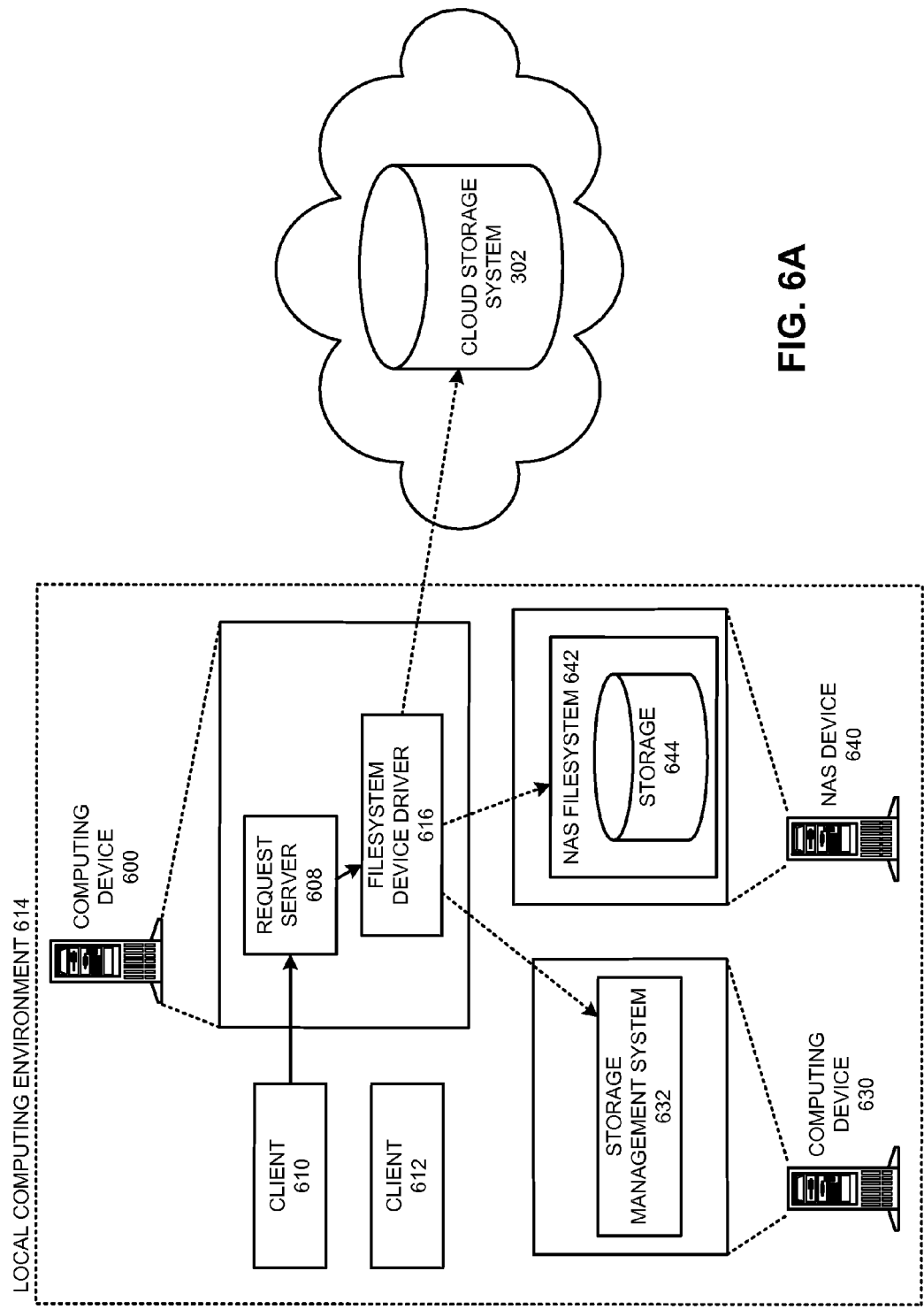
FIG. 6A illustrates a computing device that receives and forwards requests for filesystem operations in accordance with an embodiment.

FIG. 6A illustrates a computing device 600 that receives and forwards requests for filesystem operations. Computing device 600 executes a request server 608 that receives requests for file operations from clients (610-612) in its computing environment 614. Request server 608 sends instructions to a filesystem device driver 616 to perform the requested file operations. However, instead of managing a disk drive and disk operations, filesystem device driver 616 can be configured to forward filesystem-level information associated with the request to a range of other devices and/or mechanisms. For instance, filesystem device driver 616 may be configured to forward filesystem-level request information to one or more of the following: a cloud storage system 302 that is outside local computing environment 614; a storage management system 632 on another computing device 630; and/or an NAS device 640. Note that NAS device 640 may comprise a range of capabilities and architectures. For instance, NAS device 640 may comprise a compute server that uses an NAS filesystem 642 (e.g., a transactional copy-on-write filesystem) and a range of local storage capacities 644 to handle network file requests.

In some embodiments, an NAS device serves as a cloud controller for the cloud storage system. In this role, the NAS device presents a standard request interface (e.g., CIFS) to clients, and uses local storage capabilities to cache the working data set that is being accessed in its local computing environment. The high-capacity cloud storage system stores the full data set for an enterprise, and serves as a backing store for the NAS device. This architecture combines the performance and interface of a local NAS device with the capacity of a cloud storage system, while reducing management complexity.

Figure 6B:
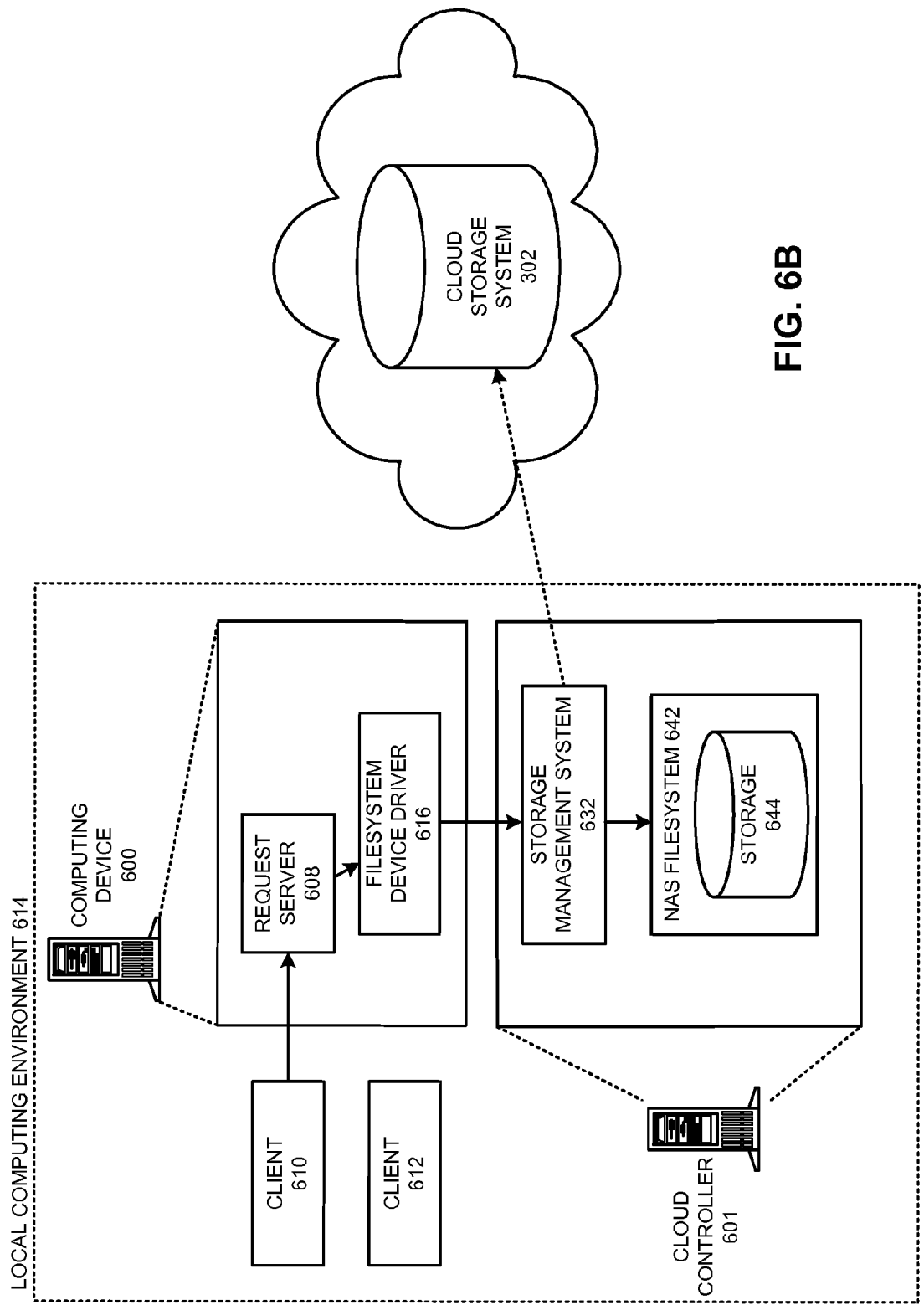
FIG. 6B illustrates a computing device that forwards requests for filesystem operations to a cloud controller in accordance with an embodiment.

FIG. 6B illustrates a scenario in which storage management system 632, NAS filesystem 642, and storage 644 are co-located on an NAS device, cloud controller 601. For instance, filesystem device driver 616 may forward filesystem-level information from requests to storage management system 632, which can then use this information to determine whether file data should be stored (or accessed) in NAS filesystem 642 and storage 644 and/or cloud storage system 302. For instance, storage management system 632 may determine how to distribute and/or duplicate file information associated with the request between storage 644 and cloud storage system 302. The local working data set for an organization is usually relatively small (compared to the full enterprise data set), and hence can typically fit into a reasonably provisioned local storage 644 mechanism. From the client perspective, data access remains substantially similar to the simplest NAS device scenarios described above; computing device 600 serves as a single point of contact, no load balancer is needed to map applications of clients to specific NAS devices, and clients 610-612 are unaware of the interaction between storage management system 632 and cloud storage system 302. Note also that while request server 608 is not limited to receiving requests from local computing environment 614, request server 608 may also be configured to service requests for other clients outside of local computing environment 614. Similarly, in some scenarios one or more front-end computing devices 600 may be co-located with cloud storage system 302.

In some embodiments, filesystem-level information can be forwarded by executing an operating system with a desired server capability (e.g., Microsoft Windows Server 2008 Core) in a virtual machine. Note that, as above, this "guest" operating system does not execute in a stand-alone configuration (e.g., with an underlying NTFS filesystem and disk drive), but instead can be configured to forward filesystem-level information (e.g., CIFS requests) to (and receive responses from) an underlying storage management system that provides data-consistent capabilities. For instance, a customized filesystem device driver in the guest operating system can forward request information to (and receive responses from) a storage management system in the host operating system. Note that such forwarding behavior in the guest operating system is distinct from typical storage operations for a guest operating system. Typically, upon receiving a request for a file operation, a guest operating system accesses an associated (virtual) filesystem and outputs a block-level storage request that is received and handled by the host operating system; hence, no filesystem-level information is sent to the host operating system. In contrast, in the described embodiments, the guest operating system forwards filesystem-level information, not block-level information, to the host operating system.

FIG. 6C illustrates a cloud controller 602 that contains all of the above-described capabilities. More specifically, cloud controller 602 receives requests directly from clients, and also serves as a front-end to remote cloud storage system 302. Cloud controller 602 includes a host operating system 604 that executes a guest operating system 606 in a virtual machine. Guest operating system 606 includes a filesystem device driver 616 that forwards requests for filesystem operations. A request server 608 (e.g., a CIFS server) in guest operating system 606 receives requests for file operations from clients (610-612) in its local computing environment 614. Request server 608 sends instructions to filesystem device driver 616 to perform the requested file operations. However, instead of managing a disk drive and disk operations (and/or using a virtual filesystem to send block-level requests to host operating system 604), filesystem device driver 616 is configured to forward filesystem-level information associated with the request to a storage management system 618 in host operating system 604 (e.g., via a virtual device interface in host operating system 604). As in FIG. 6B, storage management system 618 then determines how to distribute and/or duplicate file information associated with the request between local storage 620 and cloud storage system 302.

Figure 7A:
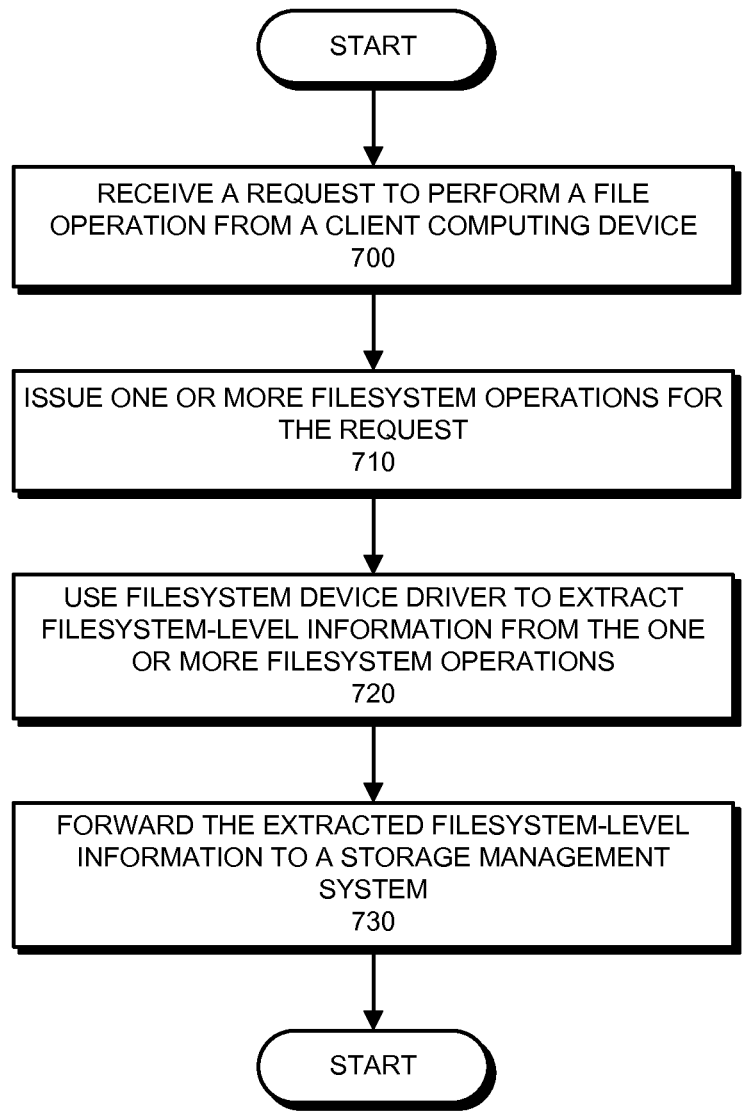
FIG. 7A presents a flow chart that illustrates the process of forwarding filesystem-level information in accordance with an embodiment.

FIG. 7A presents a flow chart that illustrates the process of forwarding filesystem-level information. During operation, a computing device receives a request for a file operation from a client computing device (operation 700). In response, the operating system of the computing device issues one or more filesystem operations for the request (operation 710). A filesystem device driver receives and extracts filesystem-level information from these filesystem operations (operation 720), and then forwards the extracted filesystem-level information to a storage management system (operation 730).

Figure 7B:
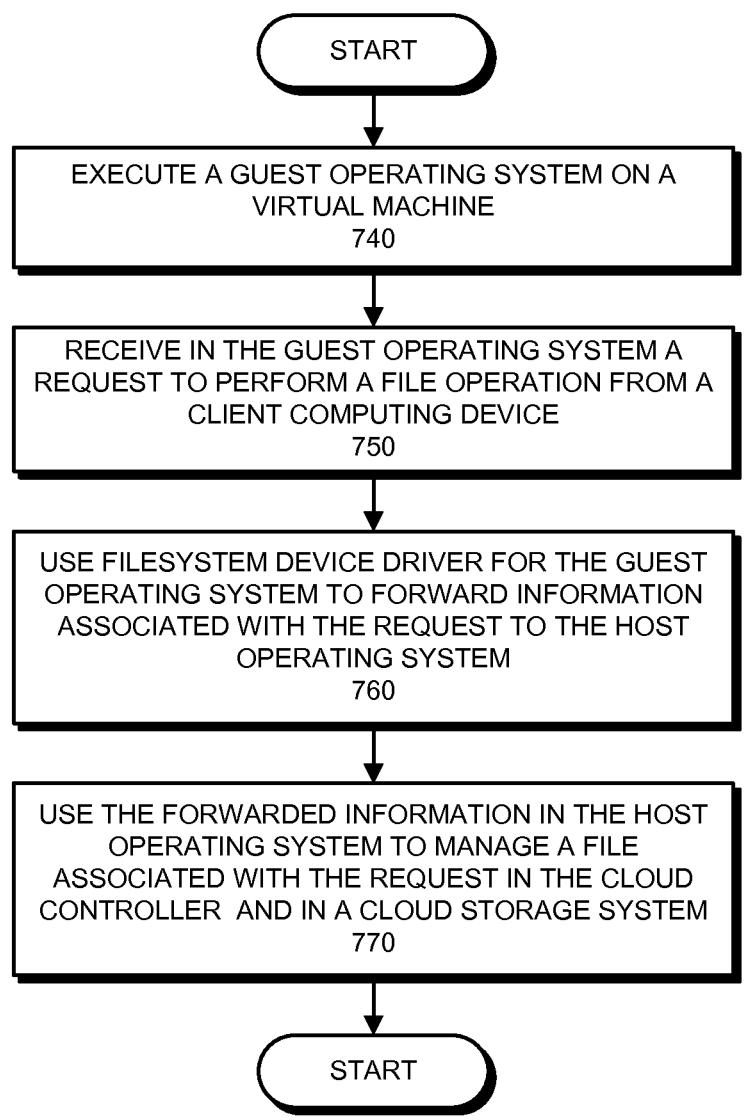
FIG. 7B presents a flow chart that illustrates the process of using a guest operating system to forward filesystem-level information in accordance with an embodiment.

FIG. 7B presents a flow chart that illustrates the process of using a guest operating system to forward filesystem-level information. During operation, a cloud controller that serves as a front-end for a cloud storage system executes a guest operating system on a virtual machine (operation 740). When this guest operating system receives a request for a file operation from a client computing device (operation 750), a filesystem device driver for the guest operating system forwards filesystem-level information associated with the request to the host operating system of the cloud controller (operation 760). The host operating system then uses this forwarded information to manage a file associated with the request in the cloud controller and in a cloud storage system (operation 770).

In some embodiments, the customized filesystem device driver extracts, tracks, and forwards client file interactions on a per-file and a per-directory basis. More specifically, semantic filesystem-level information included in the application-layer network protocol (e.g., CIFS) is forwarded by the filesystem device driver to a storage management system. This semantic information can include, but is not limited to: a file name; a file type; a requested file operation (e.g., a read, write, or update operation); a set of application information associated with the file; one or more users accessing the file; and security information for the file. Cloud controllers can use this information to determine whether a file and its associated information should be cached locally and/or forwarded to the cloud storage system (or other devices accessing the cloud storage system, as described below). For instance, the storage management system may know that certain files will be duplicated and/or shared shortly after being modified, and hence may ensure that such files are both cached locally and forwarded to the cloud storage system to facilitate the expected duplication operation.

In some embodiments, decoupling a filesystem from underlying block storage devices facilitates transparently changing (e.g., either increasing or decreasing) the amount of storage space accessible by clients. Operating systems typically assume that filesystem device drivers always manage fixed-size volumes; storage devices normally have a fixed size, so this usually is not an issue. However, one of the benefits of using cloud-based storage is the ability to easily increase data capacity on demand. For instance, for the above-described scenario where a cloud controller caches data for a cloud storage system, the amount of space available to clients can be increased by leasing additional space in the cloud (network) storage system and communicating the change to clients as needed (e.g., upon request) through the filesystem device driver. Hence, in such embodiments the customized filesystem device driver and the disclosed caching architecture substantially simplify adjusting data storage capabilities. In contrast, expanding traditional storage systems typically may involve shutting down a storage device, physically adding additional storage devices, and then reconfiguring the entire storage system to accommodate the added storage space.

In some embodiments, volume size can be changed transparently regardless of any pending client operations. In alternative embodiments, the presence of some active filesystem connections and/or operations may require some or all connected clients to be disconnected during volume size changes (e.g., preventing some clients from actively accessing files), which may be infeasible or inconvenient. Hence, in some embodiments, the filesystem device driver may be configured to claim an initial fixed size that substantially overstates the expected amount of storage, to prevent future resizing logistics. The allocated portion of the cloud storage system may initially provide only a small subset of this claimed storage size, but then subsequently be dynamically expanded as needed. In some embodiments, such size configurations may be accompanied by user quotas to prevent storage space wastage.

Note that a filesystem device driver provides a higher level of abstraction than techniques that attempt to analyze disk-block-level traffic (e.g., in the disk-level remote storage system illustrated in FIG. 2). More specifically, such techniques attempt to recreate filesystem information by reverse-engineering block-level storage transactions. However, because these storage transactions typically do not include higher-level (e.g., file- and directory-level) information, such attempts typically involve substantial effort, and do not provide the same level of tracking capabilities. In contrast, a customized filesystem-level device driver facilitates forwarding reliable high-level semantic information without additional processing overhead and without modifying the guest operating system.

In some embodiments, the described techniques provide filesystem-level proxy functionality. In many situations, proxies are implemented at the abstraction level of networking protocols, but this becomes more difficult as network protocols become more complicated (e.g., by adding application-specific information, as in CIFS). Hence, instead of re-implementing a complicated network protocol, some of the disclosed embodiments create a proxy at another, simpler layer by using a customized filesystem device driver that extracts and "tunnels" (e.g., forwards) filesystem-level information to another storage management system. Note that a filesystem-level proxy can also provide additional benefits. For instance, by emulating a local filesystem and storage device, the disclosed techniques can also overcome restrictions imposed by certain resource-intensive applications (e.g., certain databases, email server products, and/or data protection managers) to only use local storage devices.

Using Multiple Cloud Controllers to Access Cloud-Based Storage Via CIFS

The previous section described some possible architectures for cloud controllers. As described previously, two or more cloud controllers may work together to collectively manage and access a shared set of files that are stored in a cloud storage system.

FIG. 8 illustrates multiple cloud controllers 800-802 (as individually illustrated in FIGS. 3-6C and described above) that collectively manage data in cloud storage system 302. Both cloud controllers 800-802 support application-layer network requests (e.g., CIFS requests) from their respective clients, and then collectively ensure data coherency and access performance for the shared data. As described previously, storage management systems in cloud controllers 800-802 incorporate aspects of a transactional copy-on-write filesystem, thereby ensuring that file operations are data-consistent and that the system can quickly recover from crashes.

Note that the described architecture can overcome limitations in an application-layer network protocol. As described above, CIFS does not allow requests to be proxied, and requires that a single hosting server manage the underlying filesystem. However, the disclosed filesystem forwarding mechanisms provide a level of abstraction where each guest operating system assumes it is the sole manager of the shared data. The underlying storage management systems in the host operating systems can pass application-level request information to one another to ensure that consistency is maintained. Thus, the disclosed techniques leverage existing CIFS implementations (via the guest operating system), but also extend CIFS capabilities to allow multiple CIFS servers to share access to underlying data. Note that the storage management systems may not need to understand all of the application-level information being received via CIFS requests; in some instances, the cloud controllers may simply forward such information to each other. However, for some data access scenarios (e.g., multiple clients accessing a shared file via different gateways), the storage management systems in each cloud controller may need to track and actively manage file operations to ensure that data consistency is maintained for the underlying data. Note also that receiving and filtering CIFS requests at the cloud controllers can reduce the amount of protocol chatter that travels over wide-area network links. For instance, a storage management system in a local cloud controller may be able to resolve some subset of CIFS requests, thereby eliminating the need to forward associated request information to the other components of the distributed storage system and reducing request latency.

In some embodiments, an additional network storage system may be used to provide another level of redundancy (and ensure high availability). For instance, in FIG. 8, either the storage management systems in cloud controllers 800-802 and/or cloud storage system 302 may be configured to mirror updates (e.g., also send metadata and data snapshots) to a mirror storage system 804 which is primarily used in failure situations. For instance, if cloud storage system 302 were to crash or become unavailable due to a network partition, cloud controllers 800-802 could be configured to temporarily use mirror storage system 804 as their backing store. As an emergency backup, mirror storage system 804 may include fewer resources (e.g., a smaller network link and/or less storage capacity) than cloud storage system 302, but still ensure that availability and performance guarantees can be met. Note also that cloud controllers may be deployed as mirrored pairs, to ensure high availability across cloud controller failures.

Note that the disclosed system architecture also supports the rapid recovery and/or replacement of cloud controllers. A new (or recovering) cloud controller can begin by immediately reading and processing the available metadata snapshots (e.g., in the case of a recovering cloud controller, the set of metadata snapshots written to the cloud storage system since the cloud controller went offline). Because the metadata is relatively small in comparison to the actual file data, this process can be performed quickly. A cloud controller with relatively up-to-date metadata can immediately begin processing client requests; while the cloud controller does not yet have any data cached, once it has the metadata it can already access the cloud files to cache the requested file data.

In summary, embodiments of the present invention facilitate storing and accessing data in a distributed filesystem. A set of distributed cloud controllers manage data stored in a cloud-based storage system to provide a high-capacity, high-reliability storage system that ensures data consistency. These cloud controllers cache the set of data that is being used by their respective clients, store updates in cloud files on the cloud storage system, and forward updates to each other via incremental snapshots. The data capacity of the system can be easily extended as needed by leasing additional space for the cloud storage system. Hence, the disclosed embodiments present an abstraction of one global, extensible filesystem while preserving the abstraction of high-speed local data access.

Computing Environment

Figure 9:
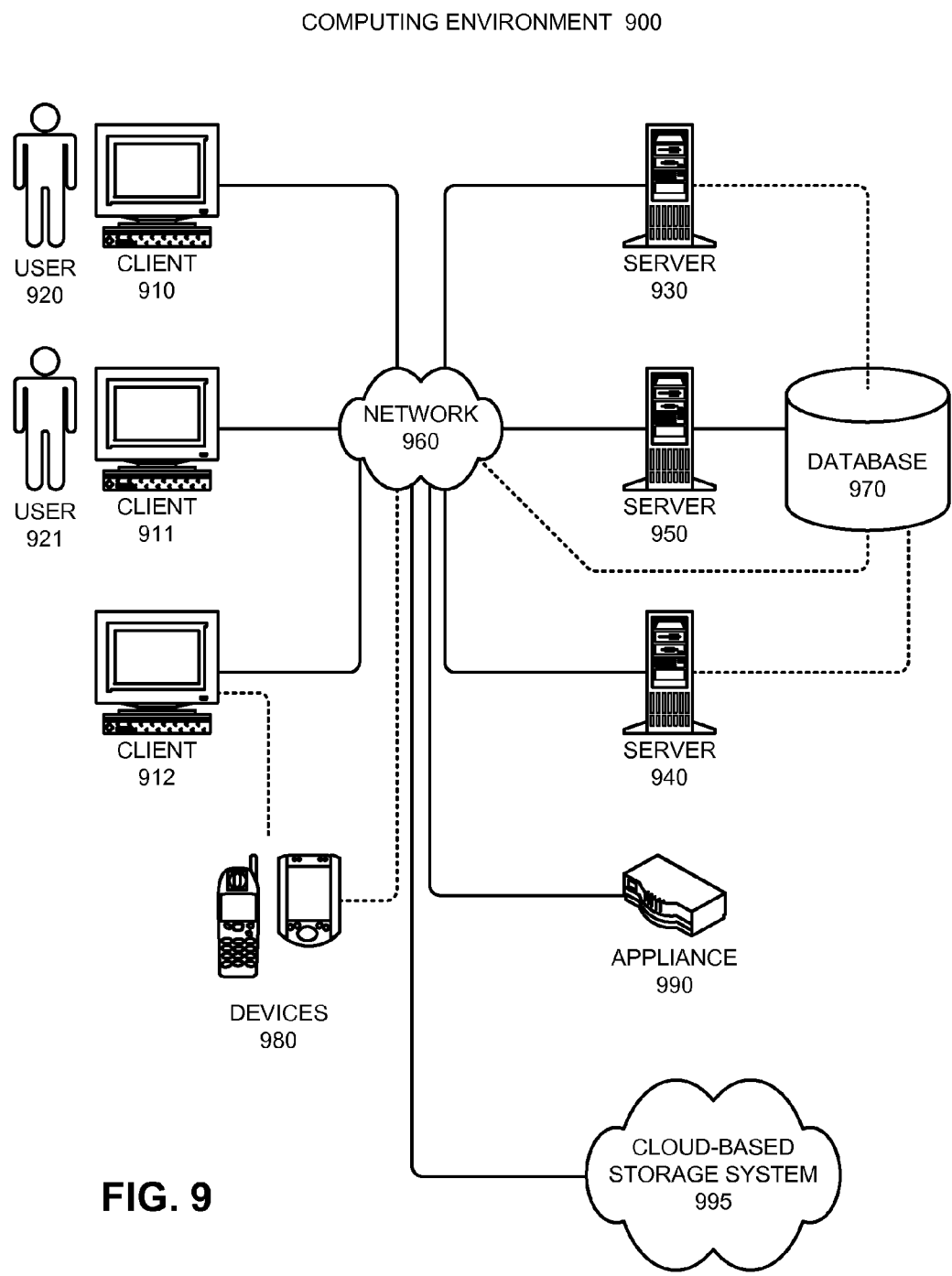
FIG. 9 illustrates a computing environment in accordance with an embodiment.

In some embodiments of the present invention, techniques for managing and/or accessing a distributed filesystem can be incorporated into a wide range of computing devices in a computing environment. For example, FIG. 9 illustrates a computing environment 900 in accordance with an embodiment of the present invention. Computing environment 900 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 9, computing environment 900 includes clients 910-912, users 920 and 921, servers 930-950, network 960, database 970, devices 980, appliance 990, and cloud-based storage system 995.

Clients 910-912 can include any node on a network that includes computational capability and includes a mechanism for communicating across the network. Additionally, clients 910-912 may comprise a tier in an n-tier application architecture, wherein clients 910-912 perform as servers (servicing requests from lower tiers or users), and wherein clients 910-912 perform as clients (forwarding the requests to a higher tier).

Similarly, servers 930-950 can generally include any node on a network including a mechanism for servicing requests from a client for computational and/or data storage resources. Servers 930-950 can participate in an advanced computing cluster, or can act as stand-alone servers. For instance, computing environment 900 can include a large number of compute nodes that are organized into a computing cluster and/or server farm. In one embodiment of the present invention, server 940 is an online "hot spare" of server 950.

Users 920 and 921 can include: an individual; a group of individuals; an organization; a group of organizations; a computing system; a group of computing systems; or any other entity that can interact with computing environment 900.

Network 960 can include any type of wired or wireless communication channel capable of coupling together computing nodes. This includes, but is not limited to, a local area network, a wide area network, or a combination of networks. In one embodiment of the present invention, network 960 includes the Internet. In some embodiments of the present invention, network 960 includes phone and cellular phone networks.

Database 970 can include any type of system for storing data in non-volatile storage. This includes, but is not limited to, systems based upon magnetic, optical, or magneto-optical storage devices, as well as storage devices based on flash memory and/or battery-backed up memory. Note that database 970 can be coupled: to a server (such as server 950), to a client, or directly to a network. In some embodiments of the present invention, database 970 is used to store information that may later be stored in unused bits of a memory pointer. Alternatively, other entities in computing environment 900 (e.g., servers 930-950) may also store such data.

Devices 980 can include any type of electronic device that can be coupled to a client, such as client 912. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 980 can be coupled directly to network 960 and can function in the same manner as clients 910-912.

Appliance 990 can include any type of appliance that can be coupled to network 960. This includes, but is not limited to, routers, switches, load balancers, network accelerators, and specialty processors. Appliance 990 may act as a gateway, a proxy, or a translator between server 940 and network 960.

Cloud-based storage system 995 can include any type of networked storage devices (e.g., a federation of homogeneous or heterogeneous storage devices) that together provide data storage capabilities to one or more clients.

Note that different embodiments of the present invention may use different system configurations, and are not limited to the system configuration illustrated in computing environment 900. In general, any device that includes computational and storage capabilities may incorporate elements of the present invention.

Figure 10:
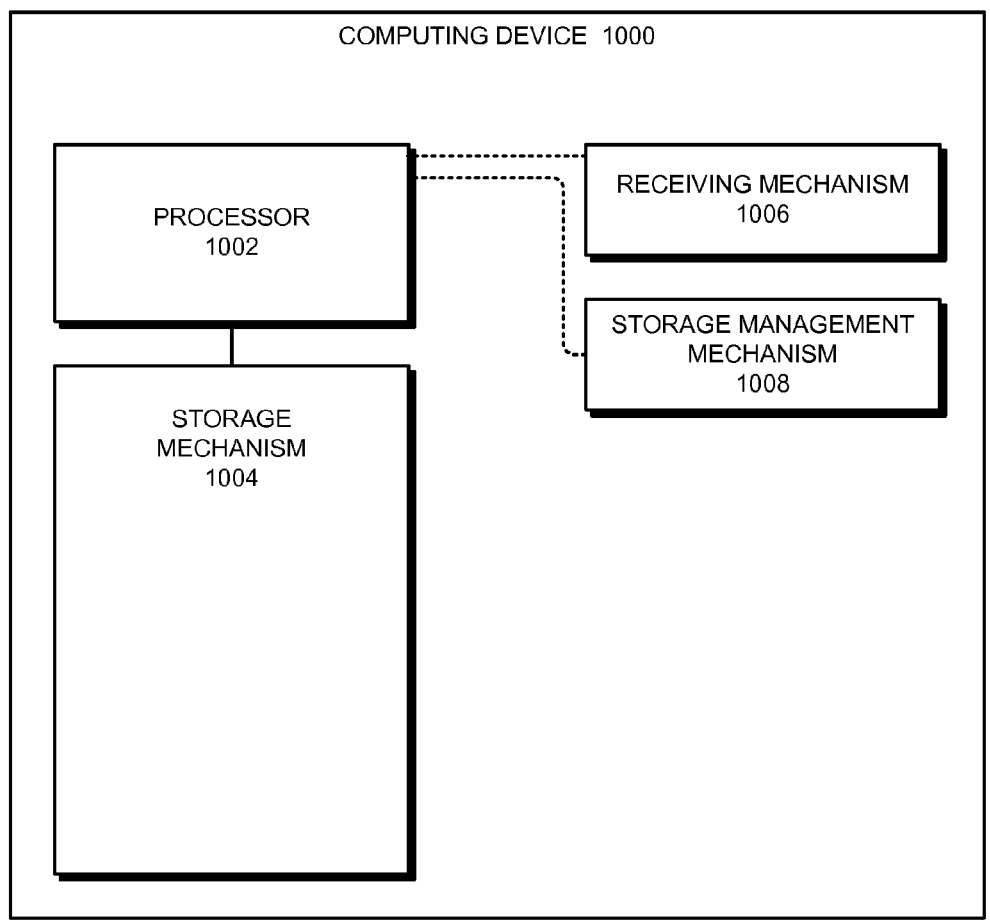
FIG. 10 illustrates a computing device in accordance with an embodiment.

FIG. 10 illustrates a computing device 1000 that includes a processor 1002 and a storage mechanism 1004. Computing device 1000 also includes a receiving mechanism 1006 and a storage management mechanism 1008.

In some embodiments, computing device 1000 uses receiving mechanism 1006, storage management mechanism 1008, and storage mechanism 1004 to pre-fetch data in a distributed filesystem. Storage mechanism 1004 stores metadata for a distributed filesystem, and computing device 1000 uses receiving mechanism 1006 to receive a request to access a data block for a file. Program instructions executing on processor 1002 traverse the stored metadata to identify a metadata entry that is associated with the data block. Storage management mechanism 1008 uses this metadata entry to download a cloud file containing the data block from a cloud storage system. While performing these operations, storage management mechanism 1008 additionally determines that an additional cloud file in the cloud storage system includes data that is likely to be accessed in conjunction with the data block and proceeds to pre-fetch this additional cloud file from the cloud storage system.

In some embodiments, computing device 1000 uses receiving mechanism 1006 to receive a request to perform a file operation from a client computing device. Receiving mechanism 1006 issues one or more filesystem operations in response to this request. A filesystem device driver executing on processor 1002 extracts filesystem-level information from these filesystem operations, and then forwards the extracted filesystem-level information to storage management mechanism 1008. Storage management mechanism 1008 uses the forwarded information to store (and manage) data associated with the request in storage mechanism 1004 and a remote network storage system (not shown).

In some embodiments of the present invention, some or all aspects of receiving mechanism 1006, storage management mechanism 1008, and/or a filesystem device driver can be implemented as dedicated hardware modules in computing device 1000. These hardware modules can include, but are not limited to, processor chips, application-specific integrated circuit (ASIC) chips, field-programmable gate arrays (FPGAs), memory chips, and other programmable-logic devices now known or later developed.

Processor 1002 can include one or more specialized circuits for performing the operations of the mechanisms. Alternatively, some or all of the operations of receiving mechanism 1006, storage management mechanism 1008, and/or a filesystem device driver may be performed using general-purpose circuits in processor 1002 that are configured using processor instructions. Thus, while FIG. 10 illustrates receiving mechanism 1006 and/or storage management mechanism 1008 as being external to processor 1002, in alternative embodiments some or all of these mechanisms can be internal to processor 1002.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for pre-fetching data in a distributed filesystem, the method comprising:
   collectively managing data coherency for the data of the distributed filesystem using two or more cloud controllers by:
      collectively presenting a unified namespace for the distributed filesystem to the clients of the distributed filesystem via the two or more cloud controllers, wherein the clients can only access the distributed filesystem via the cloud controllers, wherein the file data for the distributed filesystem is stored in a remote cloud storage system using encrypted cloud files, wherein each cloud controller caches a subset of the file data from the remote cloud storage system that is being actively accessed by that cloud controller's respective clients, wherein all new file data received by each cloud controller from its clients is written to the remote cloud storage system via the receiving cloud controller;
      maintaining at each cloud controller a copy of the complete metadata for all of the files stored in the distributed filesystem, wherein each cloud controller communicates any changes to the metadata for the distributed filesystem to the full set of cloud controllers for the distributed filesystem to ensure that the clients of the distributed filesystem share a consistent view of each file in the distributed filesystem;
      upon receiving in a cloud controller new file data from a client, storing the new file data for the distributed filesystem as cloud files in the remote cloud storage system;
      upon receiving confirmation that the new cloud files have been successfully stored in the remote cloud storage system, sending from the cloud controller an incremental metadata snapshot that includes new metadata for the distributed filesystem that describes the new file data and links to the new cloud files, wherein the incremental metadata snapshot is received by the other cloud controllers of the distributed filesystem and used to ensure data coherency for the distributed filesystem;

receiving at the cloud controller a request from a client to access a data block for a file;

traversing the cloud controller's copy of the metadata for the distributed filesystem to identify a metadata entry associated with the data block;

using the metadata entry to download a cloud file containing the data block from the remote cloud storage system to the cloud controller;

determining that an additional cloud file in the remote cloud storage system includes data that is likely to be accessed in conjunction with the data block; and pre-fetching the additional cloud file from the remote cloud storage system to the cloud controller.

2. The computer-implemented method of claim 1, wherein cloud files comprise logical storage volumes in the cloud storage system that store data and meta-data for the distributed filesystem; and wherein the cloud controller manages the layout of data being written into cloud files to improve the performance of subsequent accesses.

3. The computer-implemented method of claim 2, wherein each cloud controller participating in the distributed filesystem maintains a targeted set of meta-data for the distributed filesystem;

wherein managing the layout of data comprises storing meta-data and data in separate cloud files; and wherein one or more additional cloud controllers download a meta-data cloud file that includes new meta-data created by the first cloud controller to ensure that the targeted set of meta-data tracked by each cache controller is up-to-date.

4. The computer-implemented method of claim 3, wherein data created in the cloud controller is encrypted prior to being written to a target cloud file in the remote cloud storage system;

wherein the target cloud file is serially encrypted;

wherein an accessing cloud controller that needs only a small piece of data from the target cloud file needs to wait for the entire file to be downloaded and decrypted before it can access a desired data block from the file; and wherein the distributed filesystem is managed by one or more cloud controllers, and the cloud storage system is unaware of the organization and structure of the distributed filesystem.

5. The computer-implemented method of claim 4, wherein data in the distributed filesystem is indexed using a global address space;

wherein each cloud file is uniquely indexed in the global address space; and wherein using the metadata entry to download the cloud file further comprises:
    determining from the metadata entry that the data block is not presently stored in the cloud controller;
    using a global address stored in the metadata entry to identify the cloud file that includes the data block; and
    using an offset stored in the metadata entry to determine the location of the data block in the cloud file.

6. The computer-implemented method of claim 5, wherein the method further comprises:

determining additional data blocks and files that are likely to be referenced in close temporal proximity to the data block; and pre-fetching additional cloud files containing temporally proximate data to reduce the download latency associated with downloading cloud files from the remote cloud storage system.

7. The computer-implemented method of claim 6:

wherein determining the additional data blocks and files that are likely to be referenced in close temporal proximity further comprises receiving user feedback that indicates expected file characteristics and access patterns; and wherein determining the additional cloud file further comprises:
    receiving an indication that the data blocks for the file will be accessed sequentially;
    determining the set of sequential data blocks subsequent to the requested data block in the file;
    using the metadata for the distributed filesystem to determine a set of cloud files that contain the subsequent sequential data blocks, wherein the set of cloud files includes the additional cloud file; and
    pre-fetching the set of additional cloud files to reduce the file access latency for the file for the client.

8. The computer-implemented method of claim 6, wherein determining the additional cloud files comprises:

determining that one or more additional data blocks for the file are not presently stored in the cloud controller; and determining that the one or more additional data blocks for the file are stored in the additional cloud file.

9. The computer-implemented method of claim 8, wherein writes in a local transactional filesystem result in modifications for the file being distributed across multiple cloud files;

wherein the method further comprises grouping files and data blocks that are likely to be accessed together into the same cloud file at the time that new data is written to the remote cloud storage system to reduce the number of cloud files that need to be loaded at a subsequent time to access the grouped files and data blocks; and wherein pre-fetching the additional cloud file from the remote cloud storage system facilitates ensuring that all of the grouped data blocks for that are associated with the file are downloaded to the cloud controller.

10. The computer-implemented method of claim 6, wherein determining the additional cloud file comprises:

determining that one or more additional files that are in the same directory in the distributed filesystem as the requested file are likely to be accessed in conjunction with the data block;

determining that the one or more additional files are not presently stored in the cloud controller; and determining that the one or more additional files are stored in the additional cloud file;

wherein pre-fetching cloud files that contain additional files that are in the same directory as a requested file facilitates reducing file access latency for the client.

11. The computer-implemented method of claim 6, wherein the method further involves:

creating the file in a local transactional filesystem on the cloud controller;

creating metadata for the file on the cloud controller;

uploading the cloud file containing the data block to the remote cloud storage system;

removing the data block from the cloud controller; and downloading the cloud file from the remote cloud storage system when the data block is needed on the cloud controller.

12. The computer-implemented method of claim 11, wherein downloading the cloud file from the remote cloud storage system further comprises stitching the data block back into the local transactional filesystem.

13. A non-transitory computer-readable storage medium storing instructions that when executed by a computer cause the computer to perform a method for pre-fetching data in a distributed filesystem, the method comprising:

collectively managing data coherency for the data of the distributed filesystem using two or more cloud controllers by:

collectively presenting a unified namespace for the distributed filesystem to the clients of the distributed filesystem via the two or more cloud controllers, wherein the clients can only access the distributed filesystem via the cloud controllers, wherein the file data for the distributed filesystem is stored in a remote cloud storage system using encrypted cloud files, wherein each cloud controller caches a subset of the file data from the remote cloud storage system that is being actively accessed by that cloud controller's respective clients, wherein all new file data received by each cloud controller from its clients is written to the remote cloud storage system via the receiving cloud controller;

maintaining at each cloud controller a copy of the complete metadata for all of the files stored in the distributed filesystem, wherein each cloud controller communicates any changes to the metadata for the distributed filesystem to the full set of cloud controllers for the distributed filesystem to ensure that the clients of the distributed filesystem share a consistent view of each file in the distributed filesystem;

upon receiving in a cloud controller new file data from a client, storing the new file data for the distributed filesystem as cloud files in the remote cloud storage system;

upon receiving confirmation that the new cloud files have been successfully stored in the remote cloud storage system, sending from the cloud controller an incremental metadata snapshot that includes new metadata for the distributed filesystem that describes the new file data and links to the new cloud files, wherein the incremental metadata snapshot is received by the other cloud controllers of the distributed filesystem and used to ensure data coherency for the distributed filesystem;

receiving at the cloud controller a request from a client to access a data block for a file;

traversing the cloud controller's copy of the metadata for the distributed filesystem to identify a metadata entry associated with the data block;

using the metadata entry to download a cloud file containing the data block from the remote cloud storage system to the cloud controller;

determining that an additional cloud file in the remote cloud storage system includes data that is likely to be accessed in conjunction with the data block; and pre-fetching the additional cloud file from the remote cloud storage system to the cloud controller.

14. The non-transitory computer-readable storage medium of claim 13, wherein data in the distributed filesystem is indexed using a global address space;

wherein each cloud file is uniquely indexed in the global address space; and wherein using the metadata entry to download the cloud file further comprises:

determining from the metadata entry that the data block is not presently stored in the cloud controller;

using a global address stored in the metadata entry to identify the cloud file that includes the data block; and using an offset stored in the metadata entry to determine the location of the data block in the cloud file.

15. The non-transitory computer-readable storage medium of claim 14, wherein the method further comprises:

determining additional data blocks and files that are likely to be referenced in close temporal proximity to the data block; and pre-fetching additional cloud files containing temporally proximate data to reduce the download latency associated with downloading cloud files from the remote cloud storage system.

16. The non-transitory computer-readable storage medium of claim 15:

wherein determining the additional data blocks and files that are likely to be referenced in close temporal proximity further comprises receiving user feedback that indicates expected file characteristics and access patterns; and wherein determining the additional cloud file further comprises:

receiving an indication that the data blocks for the file will be accessed sequentially;

determining the set of sequential data blocks subsequent to the requested data block in the file;

using the metadata for the distributed filesystem to determine a set of cloud files that contain the subsequent sequential data blocks, wherein the set of cloud files includes the additional cloud file; and pre-fetching the set of additional cloud files to reduce the file access latency for the file for the client.

17. The non-transitory computer-readable storage medium of claim 15, wherein determining the additional cloud files comprises:

determining that one or more additional data blocks for the file are not presently stored in the cloud controller; and determining that the one or more additional data blocks for the file are stored in the additional cloud file.

18. The non-transitory computer-readable storage medium of claim 17, wherein writes in a local transactional filesystem result in modifications for the file being distributed across multiple cloud files;

wherein the method further comprises grouping files and data blocks that are likely to be accessed together into the same cloud file at the time that new data is written to the remote cloud storage system to reduce the number of cloud files that need to be loaded at a subsequent time to access the grouped files and data blocks; and wherein pre-fetching the additional cloud file from the remote cloud storage system facilitates ensuring that all of the grouped data blocks that are associated with the file are downloaded to the cloud controller.

19. The non-transitory computer-readable storage medium of claim 15, wherein determining the additional cloud file comprises:

determining that one or more additional files that are in the same directory in the distributed filesystem as the requested file are likely to be accessed in conjunction with the data block;

determining that the one or more additional files are not presently stored in the cloud controller; and determining that the one or more additional files are stored in the additional cloud file;
wherein pre-fetching cloud files that contain additional files that are in the same directory as a requested file facilitates reducing file access latency for the client.

20. A cloud controller that facilitates pre-fetching data in a distributed filesystem, comprising:
  a processor;
  a storage mechanism that stores metadata for the distributed filesystem;
  a receiving mechanism configured to receive a request from a client to access a data block for a file; and
  a storage management mechanism;
  wherein two or more cloud controllers are configured to collectively manage data coherency for the data of the distributed filesystem by:
    collectively presenting a unified namespace for the distributed filesystem to the clients of the distributed filesystem via the two or more cloud controllers, wherein the clients can only access the distributed filesystem via the cloud controllers, wherein the file data for the distributed filesystem is stored in a remote cloud storage system using encrypted cloud files, wherein each cloud controller caches a subset of the file data from the remote cloud storage system that is being actively accessed by that cloud controller's respective clients, wherein all new file data received by each cloud controller from its clients is written to the remote cloud storage system via the receiving cloud controller;
    maintaining in the storage mechanism of each cloud controller a copy of the complete metadata for all of the files stored in the distributed filesystem, wherein each cloud controller communicates any changes to the metadata for the distributed filesystem to the full set of cloud controllers for the distributed filesystem to ensure that the clients of the distributed filesystem share a consistent view of each file in the distributed filesystem;
    upon receiving in a given cloud controller new file data from a client, storing the new file data for the distributed filesystem as cloud files in the remote cloud storage system;
    upon receiving confirmation that the new cloud files have been successfully stored in the remote cloud storage system, sending from the given cloud controller an incremental metadata snapshot that includes new metadata for the distributed filesystem that describes the new file data and links to the new cloud files, wherein the incremental metadata snapshot is received by the other cloud controllers of the distributed filesystem and used to ensure data coherency for the distributed filesystem;
  wherein the storage management mechanism is configured to:
    traverse the stored metadata in the storage mechanism to identify a metadata entry associated with the data block;
    download a cloud file containing the data block from the remote storage system;
    determine that an additional cloud file in the remote cloud storage system includes data that is likely to be accessed in conjunction with the data block; and
    pre-fetch the additional cloud file from the remote cloud storage system.

* * * * *